United States Patent
Yang et al.

(10) Patent No.: US 11,950,237 B2
(45) Date of Patent: Apr. 2, 2024

(54) SEQUENCE BASED PHYSICAL UPLINK CONTROL CHANNEL TRANSMISSION

(71) Applicant: QUALCOMM Incorporated, San Diego, CA (US)

(72) Inventors: Wei Yang, San Diego, CA (US); Suhas Subramanya Kowshik, Cambridge, MA (US); Joseph Binamira Soriaga, San Diego, CA (US); Jing Lei, San Diego, CA (US); Seyong Park, San Diego, CA (US); Naga Bhushan, San Diego, CA (US); Yi Huang, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 332 days.

(21) Appl. No.: 17/028,806

(22) Filed: Sep. 22, 2020

(65) Prior Publication Data

US 2021/0092734 A1 Mar. 25, 2021

Related U.S. Application Data

(60) Provisional application No. 62/937,650, filed on Nov. 19, 2019, provisional application No. 62/905,131, filed on Sep. 24, 2019.

(51) Int. Cl.
    *H04W 72/21* (2023.01)
(52) U.S. Cl.
    CPC .................................. *H04W 72/21* (2023.01)
(58) Field of Classification Search
    CPC ......... H04W 72/0413; H04W 72/1284; H04W 72/0446; H04W 72/0453; H04W 72/046;
    (Continued)

(56) References Cited

U.S. PATENT DOCUMENTS

| 5,636,246 A * | 6/1997 | Tzannes .............. H04L 27/2647 |
| | | 370/480 |
| 2005/0111599 A1* | 5/2005 | Walton ................ H04B 7/0697 |
| | | 375/E1.03 |

(Continued)

FOREIGN PATENT DOCUMENTS

| EP | 3396887 A1 | 10/2018 |
| EP | 3579643 A1 | 12/2019 |

(Continued)

OTHER PUBLICATIONS

International Search Report and Written Opinion—PCT/US2020/052151—ISA/EPO—dated Mar. 12, 2021.

(Continued)

*Primary Examiner* — Chi P Cheng
(74) *Attorney, Agent, or Firm* — Holland & Hart LLP

(57) ABSTRACT

Methods, systems, and devices for wireless communications are described. A user equipment (UE) may identify that an uplink control information (UCI) payload satisfies a threshold size condition. The UE may map the UCI payload to an uplink control sequence. The UE may transmit a physical uplink control channel (PUCCH) that include the uplink control sequence to a base station. The uplink control sequence may be representative of the UCI payload. The base station may receive the PUCCH that includes the uplink control sequence from the UE. The base station may also determine the UCI payload by associating the uplink control sequence with a corresponding sequence index of the one or more sets of uplink control sequences.

38 Claims, 16 Drawing Sheets

(58) Field of Classification Search
CPC .. H04W 72/042; H04L 5/0053; H04L 5/0051; H04L 5/023; H04L 5/0005; H04L 5/0023; H04L 5/0032; H04L 5/0058; H04L 5/0091; H04L 5/0094; H04L 27/34; H04B 7/0456; H04B 7/0413; H04B 7/0602; H04J 13/0051; H04J 13/0062
USPC ........................................................ 370/329
See application file for complete search history.

(56) References Cited

U.S. PATENT DOCUMENTS

| | | | |
|---|---|---|---|
| 2011/0105056 A1* | 5/2011 | Noh | H04L 27/2602 455/110 |
| 2012/0320872 A1* | 12/2012 | Yang | H04L 25/03898 370/330 |
| 2018/0324787 A1 | 11/2018 | Yin et al. | |
| 2018/0351724 A1 | 12/2018 | Wang et al. | |
| 2019/0223199 A1* | 7/2019 | Park | H04W 72/1289 |
| 2020/0059924 A1* | 2/2020 | Matsumura | H04L 5/0051 |
| 2020/0127791 A1* | 4/2020 | Kim | H04L 9/40 |

FOREIGN PATENT DOCUMENTS

| | | |
|---|---|---|
| WO | WO-2016182378 A1 | 11/2016 |
| WO | WO-2018128574 A1 | 7/2018 |
| WO | WO-2018143395 A1 | 8/2018 |

OTHER PUBLICATIONS

Motorola Mobility, et al., "Short PUCCH Structure", 3GPP TSG RAN WG1 Meeting #89, 3GPP Draft; R1-1708308 Short PUCCH Structure, 3rd Generation Partnership Project (3GPP), Mobile Competence Centre; 650, Route Des Lucioles; F-06921 Sophia-Antipolis Cedex; France, vol. RAN WG1, No. Hangzhou; Hangzhou, P.R. China, May 15, 2017-May 19, 2017, May 14, 2017 (May 14, 2017), XP051273501, 6 Pages, Retrieved from the Internet: URL: http://www.3gpp.org/ftp/Meetings_3GPP_SYNC/RAN1/Docs/ [retrieved on May 14, 2017] Sections 1-4.
3GPP: "ETSI TS 138 213 V15.5.0 (May 2019), 5G; NR; Physical layer Procedures for Control", (3GPP TS 38.213 version 15.5.0 Release 15), 106 Pages.
Kundu L., et al., "Physical Uplink Control Channel Design for 5G New Radio", Jul. 2018, 6 Pages.
Partial International Search Report—PCT/US2020/052151—ISA/EPO—dated Jan. 11, 2021.

* cited by examiner

SEQUENCE BASED PHYSICAL UPLINK CONTROL CHANNEL TRANSMISSION

CROSS REFERENCE

The present application for patent claims the benefit of U.S. Provisional Patent Application No. 62/905,131 by KOWSHIK et al., entitled "SEQUENCE BASED PHYSICAL UPLINK CONTROL CHANNEL TRANSMISSION," filed Sep. 24, 2019, and the benefit of U.S. Provisional Patent Application No. 62/937,650 by YANG et al., entitled "SEQUENCE BASED PHYSICAL UPLINK CONTROL CHANNEL TRANSMISSION," filed Nov. 19, 2019, each of which is assigned to the assignee hereof, and each of which is expressly incorporated by reference in its entirety herein.

FIELD OF TECHNOLOGY

The following relates generally to wireless communications and more specifically to sequence based physical uplink control channel (PUCCH) transmission.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may communicate with a base station serving a cell. The communication may include the UE transmitting uplink control information (UCI) to the base station. The UCI may be channel-coded for error protection and error correction. In some cases, the channel coding may be inefficient and lead to incorrect decoding for certain channel property qualities.

SUMMARY

The described techniques relate to improved methods, systems, devices, and apparatuses that support sequence based physical uplink control channel (PUCCH) transmission. Generally, the described techniques provide for a user equipment (UE) generating and transmitting an uplink control sequence corresponding to uplink control information (UCI) as part of a sequence-based UCI transmission. The UE may identify that an UCI payload satisfies a condition, such as a threshold size condition. The UE may map the UCI payload to an uplink control sequence. The UE may transmit a PUCCH that includes the uplink control sequence to a base station. The uplink control sequence may be representative of the UCI payload. The base station may receive the PUCCH that includes the uplink control sequence from the UE. The base station may also determine the UCI payload by associating the uplink control sequence with a corresponding sequence index of one or more sets of uplink control sequences.

A method of wireless communication at a UE is described. The method may include identifying that an UCI payload satisfies a threshold size condition, mapping the UCI payload to an uplink control sequence based on the UCI payload satisfying the threshold size condition, and transmitting a PUCCH that includes the uplink control sequence, the uplink control sequence being representative of the UCI payload.

An apparatus for wireless communication at a UE is described. The apparatus may include a processor, memory coupled with the processor, and instructions stored in the memory. The instructions may be operable, when executed by the processor to cause the apparatus to identify that an UCI payload satisfies a threshold size condition, map the UCI payload to an uplink control sequence based on the UCI payload satisfying the threshold size condition, and transmit a PUCCH that includes the uplink control sequence, the uplink control sequence being representative of the UCI payload.

Another apparatus for wireless communication at a UE is described. The apparatus may include means for identifying that an UCI payload satisfies a threshold size condition, mapping the UCI payload to an uplink control sequence based on the UCI payload satisfying the threshold size condition, and transmitting a PUCCH that includes the uplink control sequence, the uplink control sequence being representative of the UCI payload.

A non-transitory computer-readable medium storing code for wireless communication at a UE is described. The code may include instructions executable by a processor to identify that an UCI payload satisfies a threshold size condition, map the UCI payload to an uplink control sequence based on the UCI payload satisfying the threshold size condition, and transmit a PUCCH that includes the uplink control sequence, the uplink control sequence being representative of the UCI payload.

Transmitting the PUCCH may include operations, features, means, or instructions for transmitting the uplink control sequence as a non-coherent transmission without a demodulation reference signal.

Mapping the UCI payload to the uplink control sequence may include operations, features, means, or instructions for converting the UCI payload to a decimal value, and selecting the uplink control sequence from a set of uplink control sequences based on the decimal value.

A quantity (or number) of uplink control sequences in the set of uplink control sequences may be greater than or equal to $2^k$, where k may be a payload size.

Selecting the uplink control sequence from the set of uplink control sequences may include operations, features, means, or instructions for selecting the uplink control sequence that may be associated with the decimal value.

The uplink control sequence may be multiplied with a signature sequence, where transmission of the uplink control sequence comprises transmission of the multiplied uplink control sequence with the signature sequence.

The multiplexing index may be received from a base station, and the signature sequence may be generated based at least in part on the multiplexing index.

The signature sequence may be associated with one of a set of transmission antennas of the UE.

The signature sequence associated with the one of the set of transmission antennas may be orthogonal to other signature sequences associated with others of the set of transmission antennas of the UE.

The uplink control sequence and the signature sequence may be of a same length.

An indication may be received that the UE may be to use some or all of the set of transmission antennas in transmitting the PUCCH.

The indication may be associated with a format of the PUCCH.

The signature sequence may be associated with the UE or with a PUCCH resource that the UE uses to transmit the PUCCH.

A multiplexing index may be received from a base station, where the multiplexing index may be different from other multiplexing indices provided to other UEs also scheduled to transmit using resources assigned to the UE for the PUCCH. The multiplexing index may be used to map the UCI payload to the uplink control sequence.

The multiplexing index may be associated with a PUCCH resource.

Using the multiplexing index to map the UCI payload to the uplink control sequence may include operations, features, means, or instructions for selecting a set of uplink control sequences from a set of sets of uplink control sequences based on the multiplexing index, and selecting the uplink control sequence from the set of uplink control sequences.

Using the multiplexing index to map the UCI payload to the uplink control sequence may include operations, features, means, or instructions for selecting the uplink control sequence from a set of uplink control sequences based on the UCI payload and the multiplexing index.

Selecting the uplink control sequence from the set of uplink control sequences may include operations, features, means, or instructions for converting the multiplexing index into a binary string, concatenating the binary string with the UCI payload to form a concatenated string, converting the concatenated string to a decimal value, and selecting the uplink control sequence from the set of uplink control sequences based on the decimal value representing the concatenated string.

Selecting the uplink control sequence from the set of uplink control sequences may include operations, features, means, or instructions for converting the UCI payload to a decimal value, summing a first multiple of the decimal value representing the UCI payload with a second multiple of the multiplexing index to form a summed decimal value, and selecting the uplink control sequence from the set of uplink control sequences based on the summed decimal value.

The first multiple may be based on a quantity of UEs scheduled to transmit using the resources assigned to the UE for the PUCCH, where the quantity of UEs includes the UE and the other UEs, and where the second multiple may be one.

The first multiple may be one and the second multiple may be based on a quantity of bits of the UCI payload.

Mapping the UCI payload to the uplink control sequence may include operations, features, means, or instructions for selecting the uplink control sequence from one or more sets of uplink control sequences, where sequences in the one or more sets of uplink control sequences may be Zadoff-Chu (ZC) sequences, binary or quadrature phase shift keying modulated Gold or M sequences, or discrete Fourier transform-based sequences.

The one or more sets of uplink control sequences include discrete Fourier transform-based sequences which may be based on a deterministic sampling of row entries in a selected column of a discrete Fourier transform matrix in accordance with a sampling function.

The one or more sets of uplink control sequences include inverse discrete Fourier transform-based sequences which may be based on a deterministic sampling of row entries in a selected column of an inverse discrete Fourier transform matrix in accordance with a sampling function.

Selecting the uplink control sequence further may include operations, features, means, or instructions for generating a seed for a binary or quadrature phase shift keying modulated Gold or M sequence, based on the UCI payload, and selecting the binary or quadrature phase shift keying modulated Gold or M sequence based on the generated seed.

The UCI payload may be mapped to the seed, and the binary or quadrature phase shift keying modulated Gold or M sequence may be selected based on the mapping.

The seed may be generated based on the UCI payload and a UE identifier, a cell identifier, or a multiplexing index, or a combination thereof.

The multiplexing index may be received from a base station, where the multiplexing index may be different from other multiplexing indices provided to other UEs also scheduled to transmit using resources assigned to the UE for the physical uplink control channel. The multiplexing index may be used to map the UCI payload to generate the seed.

Using the multiplexing index to map the UCI payload to generate the seed further may include operations, features, means, or instructions for converting the multiplexing index into a binary string, concatenating the binary string with the UCI payload to form a concatenated string, converting the concatenated string to a decimal value, and generating the seed based on the decimal value representing the concatenated string.

Using the multiplexing index to map the UCI payload to generate the seed further may include operations, features, means, or instructions for converting the UCI payload to a decimal value, summing a first multiple of the decimal value representing the UCI payload with a second multiple of the multiplexing index to form a summed decimal value, and generating the seed based on the summed decimal value.

A transform precoding operation may be applied to the uplink control sequence. The uplink control sequence may be mapped to frequency domain resources after application of the transform precoding operation and prior to transmission of the PUCCH.

The uplink control sequence may be mapped to frequency domain resources prior to transmission of the PUCCH, where the uplink control sequence is non-transform precoded. Additionally, identifying that the UCI payload satisfies the threshold size condition further may include operations, features, means, or instructions for identifying that the UCI payload is less than or equal to a predetermined maximum payload size.

A method of wireless communications at a base station is described. The method may include identifying that an UCI payload is to be transmitted by a UE as an uplink control sequence when the UCI payload satisfies a threshold size condition, identifying one or more sets of uplink control sequences from which the uplink control sequence is to be selected by the UE, receiving a PUCCH that includes the uplink control sequence, the uplink control sequence being representative of the UCI payload, and determining the UCI payload by associating the uplink control sequence with a corresponding sequence index of the one or more sets of uplink control sequences.

An apparatus for wireless communications at a base station is described. The apparatus may include a processor, memory coupled with the processor, and instructions stored in the memory. The instructions may be operable, when executed by the processor, to cause the apparatus to identify that an UCI payload is to be transmitted by a UE as an uplink control sequence when the UCI payload satisfies a threshold size condition, identify one or more sets of uplink control sequences from which the uplink control sequence is to be selected by the UE, receive a PUCCH that includes the uplink control sequence, the uplink control sequence being representative of the UCI payload, and determine the UCI payload by associating the uplink control sequence with a corresponding sequence index of the one or more sets of uplink control sequences.

Another apparatus for wireless communications at a base station is described. The apparatus may include means for identifying that an UCI payload is to be transmitted by a UE as an uplink control sequence when the UCI payload satisfies a threshold size condition, identifying one or more sets of uplink control sequences from which the uplink control sequence is to be selected by the UE, receiving a PUCCH that includes the uplink control sequence, the uplink control sequence being representative of the UCI payload, and determining the UCI payload by associating the uplink control sequence with a corresponding sequence index of the one or more sets of uplink control sequences.

A non-transitory computer-readable medium storing code for wireless communications at a base station is described. The code may include instructions executable by a processor to identify that an UCI payload is to be transmitted by a UE as an uplink control sequence when the UCI payload satisfies a threshold size condition, identify one or more sets of uplink control sequences from which the uplink control sequence is to be selected by the UE, receive a PUCCH that includes the uplink control sequence, the uplink control sequence being representative of the UCI payload, and determine the UCI payload by associating the uplink control sequence with a corresponding sequence index of the one or more sets of uplink control sequences.

Receiving the PUCCH may include operations, features, means, or instructions for receiving the uplink control sequence as a non-coherent transmission without a demodulation reference signal.

The sequence index may be a decimal value of the UCI payload.

Determining the UCI payload may include operations, features, means, or instructions for identifying that the uplink control sequence may have been multiplied with a signature sequence prior to transmission of the uplink control sequence.

The signature sequence may be associated with one of a set of transmission antennas of the UE.

The signature sequence associated with the one of the set of transmission antennas may be orthogonal to other signature sequences associated with others of the set of transmission antennas of the UE.

The signature sequence and the uplink control sequence prior to multiplication with the signature sequence may be of a same length.

An indication may be transmitted that the UE may be to use some or all of the set of transmission antennas in transmitting the PUCCH.

The indication may be associated with a format of the PUCCH.

A multiplexing index may be transmitted to the UE, where the multiplexing index may be different from other multiplexing indices provided to other UEs also scheduled to transmit using resources assigned to the UE for the PUCCH.

The multiplexing index may be associated with a PUCCH resource.

The one or more sets of uplink control sequences from which the uplink control sequence may be selected may be a set of uplink control sequences of a set of sets of uplink control sequences, the set of uplink control sequences corresponding to the multiplexing index.

The one or more sets of uplink control resources from which the uplink control sequence may be selected may be common to the UE and to the other UEs.

The one or more sets of uplink control resources from which the uplink control sequence may be selected includes sequences that may be ZC sequences, binary or quadrature phase shift keying modulated Gold or M sequences, discrete Fourier transform-based sequences, or inverse discrete Fourier transform-based sequences.

DETAILED DESCRIPTION

Figure 1:
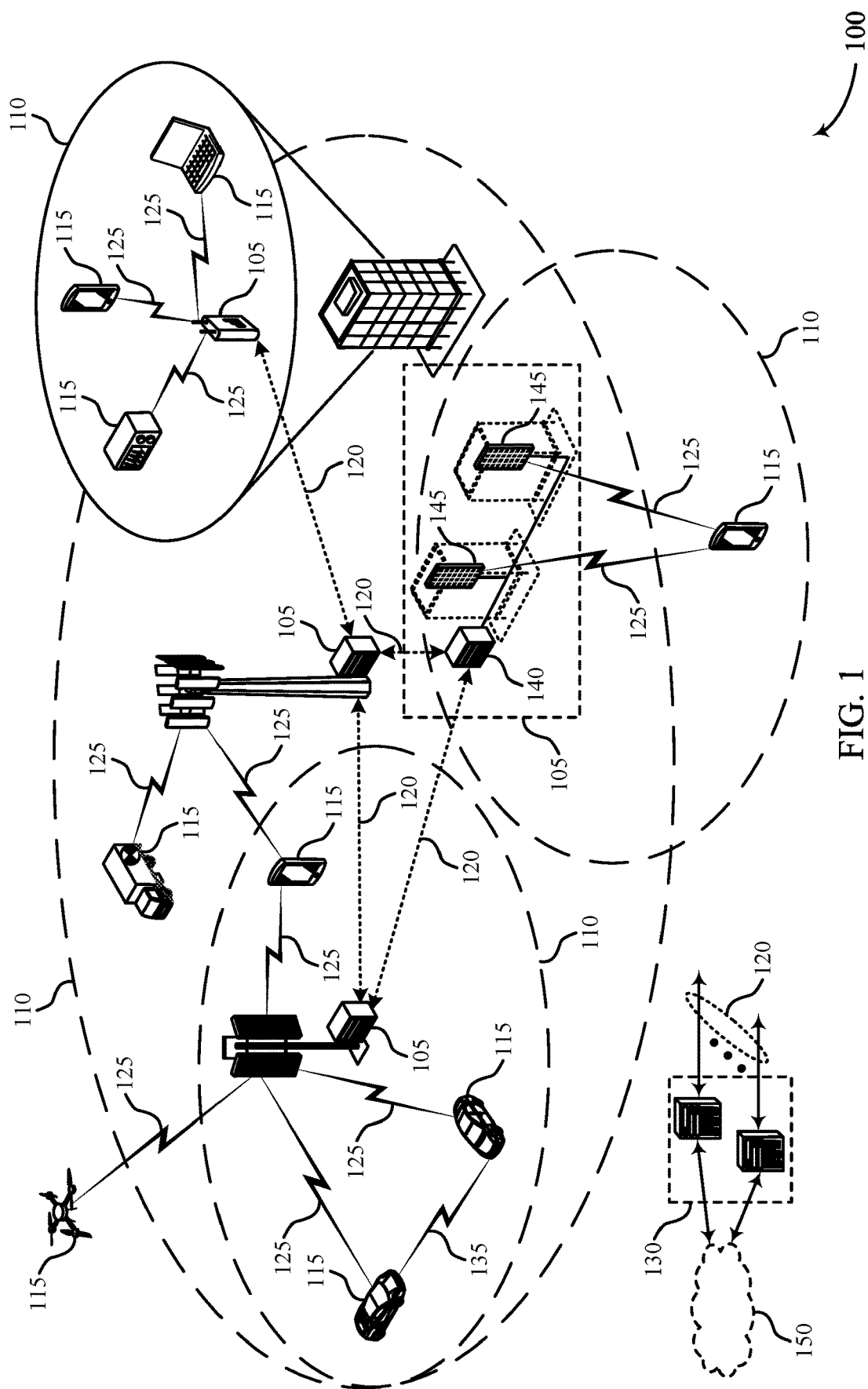
FIG. 1 illustrates an example of a system for wireless communications that supports sequence based physical uplink control channel (PUCCH) transmission in accordance with aspects of the present disclosure.

A user equipment (UE) may transmit uplink control information (UCI) to a base station. The UCI may contain information from the UE such as a scheduling request (SR), hybrid automatic repeat request (HARQ) acknowledgement/ negative acknowledgment (ACK/NACK) feedback, and channel quality indicator (CQI) information. One or more UEs may transmit UCI to a base station using the same resources or partially overlapping resources. Thus, each UCI transmitted by each UE may be coded differently to provide error protection and correction when the quantity (e.g., the number) of UCI bits exceeds two bits (e.g., in a short physical uplink control channel (PUCCH) format). The type of coding may depend on the UCI payload size (e.g., size of the payload in bits).

In some cases, the UCI may be channel-coded. For example, if the UCI payload size K is less than or equal to 11 bits, then a Reed-Muller channel code may be used. If the payload size is $12 \leq K \leq 19$, cyclic redundancy check (CRC)-aided parity check Polar channel code may be used. If the payload size K is greater than 19, CRC-aided polar channel code may be used. In the cases of channel coding, the UCI may be transmitted by a UE in a physical uplink control channel (PUCCH) and the UE may also include a demodulation reference signal (DMRS) transmission. The DMRS may be used in channel estimation to determine the channel coefficients. The UCI may be coherently decoded using the estimated channel.

At low signal-to-noise ratio (SNR), the quality of the channel estimation may limit the performance of PUCCH reception, and therefore the coverage of a cell. In order to improve the coverage, sequence-based transmission may be used instead of a channel-coding based scheme. Sequence-based transmission may not use coding or modulation, and may not include the generation or transmission of a DMRS. Sequence-based transmission without the generation or transmission of a DMRS may be an example of a non-coherent transmission.

Sequence-based transmission may also increase decoding performance and detection performance at the receiver (e.g., a base station).

A UE performing sequence-based transmission may generate a sequence based on the UCI payload, and transmit the sequence to the base station. The sequence may be of the format $a_0, a_1, \ldots a_{k-1}$ in some examples. The sequence-based generation may be used when the payload size K satisfies a threshold. For example, sequence-based coding may be used in cases where $K \leq 11$, or the threshold may be when $K \leq 19$. The sequence-based coding process may utilize non-coherent transmission, as there may not be a DMRS transmitted along with the UCI in the PUCCH. Thus, channel estimation may not be required by the receiver. Therefore, the performance of the sequence based noncoherent transmission may not rely on the quality of channel estimation.

Sequence based transmission may generally include a UE performing sequence generation, mapping the sequence to resource elements (REs), and transmitting the sequence in a PUCCH. More specifically, the sequence generation may include determining that a UCI payload satisfies a threshold size, converting the UCI to a decimal equivalent, using a multiplexing index to select a sequence from a sequence pool, and generating a full sequence based on the selected sequence and the decimal equivalent of the UCI. In some cases, the UE may apply transform precoding before mapping the sequence to REs.

Sequence-based transmission may be used both in single-UE scenarios and in scenarios with multiple UEs. In single UE scenarios, and in cases where the UE is equipped with multiple antennas, the UE may transmit the sequences using multiple antennas. The UE may achieve this using antenna-specific masking. In multiple-UE scenarios, multiple UEs may transmit sequences on the same set of resources. In some cases with multiple UEs, each UE may have a separate sequence pool from which to generate a sequence. In other cases with multiple UEs, more than one UE may generate a sequence based on a joint sequence pool.

Aspects of the disclosure are initially described in the context of wireless communications systems. Aspects of the disclosure are then described in the context of process diagrams and process flows. Aspects of the disclosure are further illustrated by and described with reference to apparatus diagrams, system diagrams, and flowcharts that relate to sequence based PUCCH transmission.

FIG. 1 illustrates an example of a wireless communications system 100 that supports sequence based PUCCH transmission in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a. of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

One or more UEs 115 may transmit UCI to a base station 105. In some cases, UEs 15 may utilize sequence-based transmission rather than channel-coding to transmit the UCI. UEs 115 may generate a sequence for the sequence-based transmission. The sequence may be generated by the UE 115 based on determining that the UCI payload satisfies a threshold size condition, and UE 115 may map the UCI payload to an uplink control sequence. The UE 115 may transmit a PUCCH to the base station 105 including the uplink control sequence that corresponds to the UCI payload. The base station 105 may receive the uplink control sequence, and may determine the UCI based on the sequence. In some bases, base station 105 may transmit multiplexing information to facilitate that transmission of uplink control sequences by multiple UEs 115.

The actions performed by a UE 115 described herein may be implemented to realize one or more potential advantages. One implementation may allow a UE 115 to save power and increase battery life by decreasing the number of retransmissions of a UCI for particular applications by improving the performance of PUCCH reception at a base station 105. Additionally, actions performed by the UE 115 may also improve reliability of service at the corresponding UE 115, by improving the efficiency of transmission of UCI and the corresponding channel quality information provided in the UCI.

Figure 2:
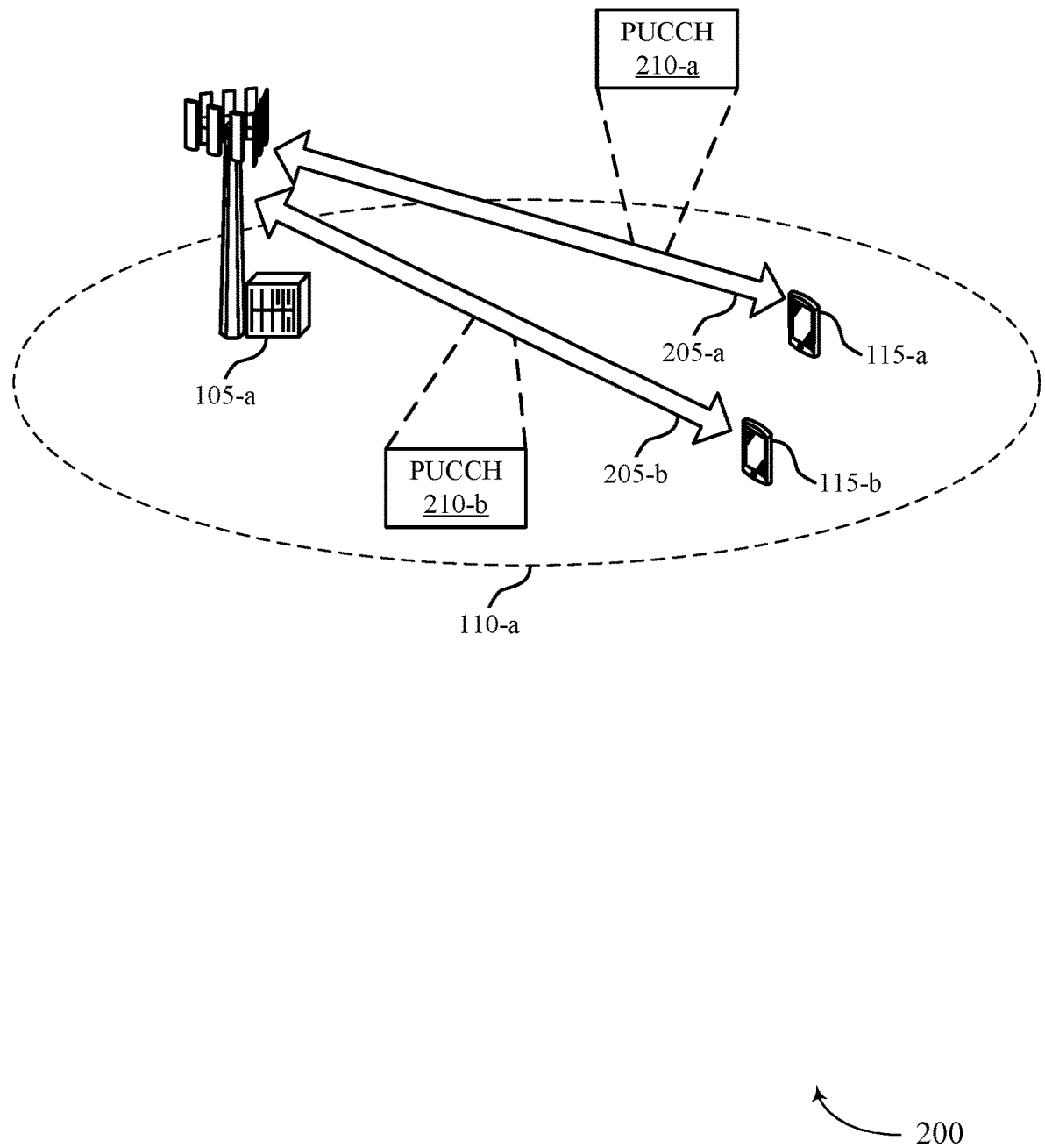
FIG. 2 illustrates an example of a wireless communications system that supports sequence based PUCCH transmission in accordance with aspects of the present disclosure.

FIG. 2 illustrates an example of a wireless communications system 200 that supports sequence based PUCCH transmission in accordance with aspects of the present disclosure. In some examples, wireless communications system 200 may implement aspects of wireless communication system 100. Wireless communications system 200 may include UE 115-a and UE 115-b, both of which may be examples of UEs 115 as described with respect to FIG. 1. Wireless communications system 200 may also include base station 105-a which may be an example of base stations 105 as described with respect to FIG. 1. UEs 115-a and 115-b may communicate with base station 105-a over communication links 205-a and 205-b, respectively. UEs 115 may utilize sequence-based transmission to generate sequences for the transmission of UCI in the PUCCH 210 transmitted in communication links 205.

One or more UEs 115 may be served by base station 105. UEs 115 may generate and transmit UCI to base station 105-a using a PUCCH 210. The UCI may include a set of information, such as a SR, HARQ feedback (e.g., ACK/NACK), CQI information, or other information, including information about channel quality measurement and transmission scheduling. UE 115-a may determine that the UCI payload size k satisfies a threshold size condition, such as k≤11, or k≤19. In this case, UE 115-a may determine to perform sequence-based transmission of the UCI in PUCCH 210-a. In some cases, UE 115-a may be equipped with multiple transmit antennas. In these cases, UE 115-a may select a base sequence x, and may multiply the base sequence point-wise by an antenna-specific sequence of equal length. The antenna-specific sequence may be referred to as a signature sequence. The signature sequences among different transmit antennas may be orthogonal to each other.

For each PUCCH resource, base station 105-a may configure UE 115-a to the number of transmit antennas expected for the transmission on this PUCCH resource. Alternatively, the single antenna or multiple antenna transmission may be defined in different PUCCH formats (e.g., different from the existing PUCCH formats 0, 1, 2, 3, 4 in NR).

In some cases, UE 115-a and UE 115-b may be configured to transmit sequences on the same set of resources. For $K_{UE}$ UEs 115, base station-a may indicate to UE 115-a and UE 115-b a multiplexing index $l_u \in \{0, 1, \ldots, K_{UE}-1\}$ which may be different for each UE 115-a and 115-b. The multiplexing index may be associated with a PUCCH resource, such as part of the PUCCH resource configuration. The PUCCH resource configuration may be indicated to the UEs 115 and may include the multiplexing index information. The UEs 115 may generate sequences based on separate sequence pools (e.g., from a sequence pool distinct to each UE 115-a or UE 115-b), or may generate sequences based on a joint sequence pool (e.g., one sequence pool used by both UE 115-a and UE 115-b).

UE 115-a and UE 115-b may therefore, in some cases, both generate sequences. UE 115-a and UE 115-b may both generate sequences first by determining whether the UCI to be transmitted satisfies a threshold payload size. Each UE 115 may then convert the UCI to a decimal equivalent. Based on the received multiplexing index, UEs 115-a and 115-b may choose a sequence from a sequence pool. The sequence pool may be a set of sequences from which a UE 115 may select a sequence for a PUCCH 210 transmission. A matrix of sequences may be an example of a sequence pool, or the sequence pool may be another structure or set of sequences. UE 115-*a* and UE 115-*b* may select a sequence from a sequence pool, either based on the joint sequence pool or based on separate sequence pools (distinct to each UE 115), and generate the full sequence based on the selected sequence from the pool (based on the multiplexing index) and the decimal equivalent of the UCI. UE 115-*a* may transmit the sequence in PUCCH 210-*a* over communication link 205-*a* to base station 105-*a*. UE 115-*b* may transmit the generated sequence in PUCCH 210-*b* over communication link 205-*b*. In some cases, the sequences transmitted by UE 115-*a* and UE 115-*b* may be transmitted in overlapping resources.

Base station 105-*b* may receive both generated sequences, and may determine the separate UCI payloads by associating the received uplink control sequences with a corresponding sequence index of the one or more sets of uplink control sequences.

In some cases, only one UE 115 (e.g., UE 115-*a*) may transmit a generated uplink control sequence to base station 105-*a*. In other cases, both UE 115-*a* and 115-*b*, and other UEs 115 not shown in wireless communication system 200, may transmit generated uplink control sequences. In some cases, the uplink control sequences transmitted by different UEs 115 may be transmitted in overlapping resources, or the uplink control sequences transmitted by different UEs 115 may be transmitted in distinct non-overlapping resources (e.g., time- and frequency-domain resources).

Figure 3A:
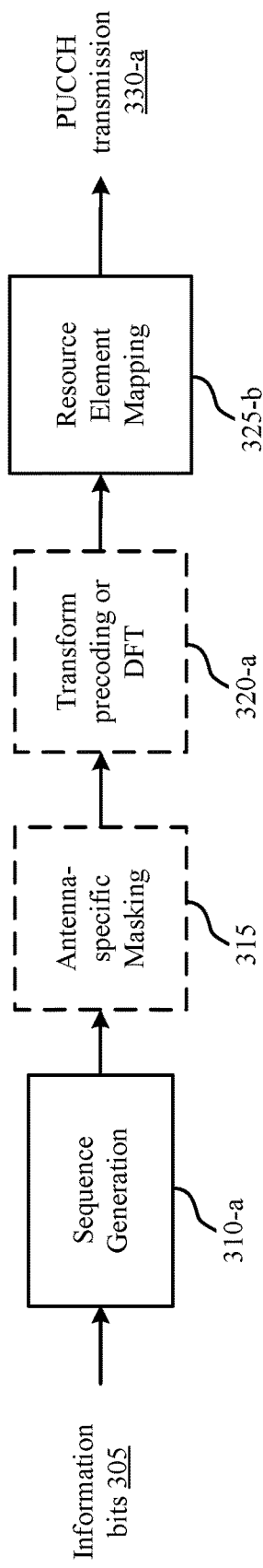
FIGS. 3A and 3B illustrate examples of process diagrams that support sequence based PUCCH transmission in accordance with aspects of the present disclosure.
Figure 3B:
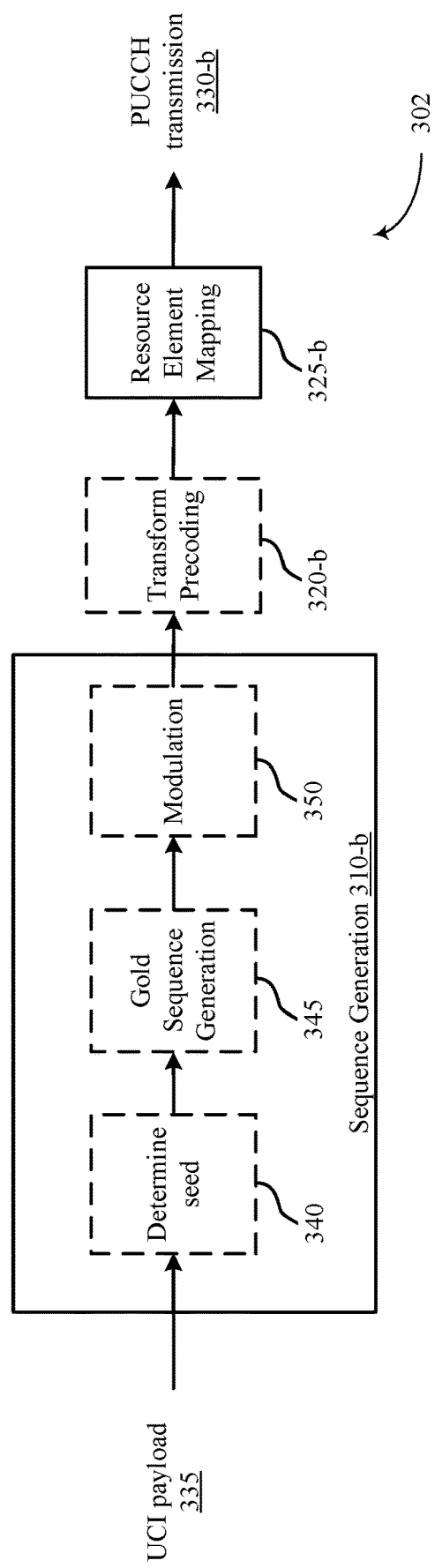

FIGS. 3A and 3B illustrate examples of process diagrams 301 and 302 that support sequence based PUCCH transmission in accordance with aspects of the present disclosure. In some examples, process diagrams 301 and 302 may implement aspects of wireless communication systems 100 and 200. For example, a UE 115 may generate an uplink control sequence based on the steps outlined in process diagrams 301 and 302. A UE 115, such as UE 115-*a* or UE 115-*b* as described with respect to FIG. 2, or a UE 115 as described with respect to FIG. 1, may generate and transmit a sequence based on process diagrams 301 and 302. Process diagram 301 may show a general process for generating a sequence and transmitting a PUCCH based on the sequence, and process diagram 302 may show an example of sequence based PUCCH transmission in the case of binary phase-shift keying (BPSK) or quadrature phase shift keying (QPSK) Gold or M sequence generation.

In process diagram 301, a UE 115 may first take information bits 305 to be transmitted in UCI. UE 115 may generate a sequence at 310-*a* based on a multiplexing index and other parameters. UE 115 may in some cases apply antenna-specific masking at 315, and may, in some cases, apply transform precoding or a DFT 320-*a* to the generated sequence. UE 115 may map the generated sequence to resource elements at 325-*b*, and may transmit the sequence in a PUCCH 330-*a* (e.g., PUCCH 210).

In some cases, one UE 115 may generate and transmit an uplink sequence over a set of PUCCH resources. At the sequence generation step 310, in the case of a single UE 115, N, M, k∈ℕ may be given, with M=$2^k$. M may be the number of sequences in the sequence pool C. N may be the length of each sequence, and k may be the number of UCI bits. The set of sequences (i.e., a sequence pool or a codebook) may be represented by a matrix C of size N×M, where each column vector may be a sequence. The matrix C may be an example of a sequence pool, but the sequence pool may be represented by other structures in other cases. The matrix $c$ may be generated on a cell-by-cell basis. Next, the UE 115 may convert the binary string a (e.g., $a_0$, $a_1$, ..., $a_{k-1}$) corresponding to the UCI to a decimal value, which may be denoted by $l_a$. The binary string may be converted to the decimal value $l_a$ by the equation $l_a = \Sigma_{i=0}^{k-1} 2^i a_i$ or by the equation $l_a = \Sigma_{i=0}^{k-1} 2^i a_{k-1-i}$ or by other equations to convert the string to decimal values.

UE 115 may then select the sequence $x = c_{l_a} = [c_{l_a}(0), \ldots, c_{l_a}(N-1)]$, which may correspond to the $(l_a+1)^{th}$ column of $c$. In this case, the column index may start from 0, such that the first column $c$ is $c_0$.

At 315, UE 115 may in some cases apply antenna-specific masking. This may apply in cases of single UE MIMO, and therefore when a UE 115 is equipped with multiple transmit antennas, the UE 115 may transmit using multiple transmit antennas in order to harvest diversity gain. This transmission may be achieved by using a same base sequence x, and multiplying x point-wise (e.g., entry-wise or bit-wise) by an antenna-specific sequence of equal length. This antenna-specific sequence may be referred to as a signature sequence. The signature sequence among different transmit antennas may be orthogonal to each other. Specifically, two complex-valued sequences a and b of length N may be said to be orthogonal if $\Sigma_{k=0}^{N-1} a(k) \cdot b^*(k) = 0$, where * indicates the complex conjugate.

For each PUCCH resource, the base station 105 may configure to the UE 115 the number of transmit antennas expected for the transmission on this PUCCH resource. Alternatively, whether to use single-antenna or multiple antenna transmission, and the configuration of the transmission may be defined as different PUCCH formats. For example, these PUCCH formats may be different from the existing PUCCH formats 0, 1, 2, 3, 4 in the case of NR.

For example, in cases where a UE 115 has two transmit antennas, the signature for each antenna may be $$d^{(0)} = [1,1,\ldots,1] \Rightarrow y^{(0)}(k) = x(k) \cdot d^{(0)}(k) \text{ and}$$

$$d^{(1)} = [1,-1,\ldots,1,-1] \Rightarrow y^{(1)}(k) = x(k) \cdot d^{(1)}(k)$$

In another example, in cases where the UE has four transmit antennas, then signatures for each antenna may be $$d^{(0)} = [1,1,\ldots,1]$$

$$d^{(1)} = [1,j,-1,-j,\ldots,1,j,-1,-j]$$

$$d^{(2)} = [1,-1,\ldots,1,-1]$$

$$d^{(3)} = [1,-j,-1,j,\ldots,1,-j,-1,j]$$

Alternatively, the set of signatures for the UE with four antennas may be:

$$d^{(0)} = [1,1,\ldots,1,1]$$

$$d^{(1)} = [1,-1,\ldots,1,-1]$$

$$d^{(2)} = [1,1,-1,-1,\ldots,1,1,-1,-1]$$

$$d^{(3)} = [1,-1,-1,1,\ldots,1,-1,-1,1]$$

In some cases, multiple UEs 115 may transmit sequence on the same set of resources. For $K_{UE}$ UEs 115, the base station 105 may indicate to the UE 115 a multiplexing index $l_u \in \{0, 1, \ldots, K_{UE}-1\}$ which may be different for each different UE 115. The multiplexing index may be associated with a PUCCH resource, such as part of the PUCCH resource configuration. The PUCCH resource configuration may be indicated to the UE 115 and may include the multiplexing index information. In cases of multiple UEs 115, the UEs 115 may generate sequences based on separate sequence pools (e.g., from a sequence pool distinct to each UE 115), or may generate sequences based on a joint sequence pool (e.g., one sequence pool used by more than one UE 115).

In the case of separate sequence pools, each MI may be associated with a distinct sequence pool of size $M=2^k$. In these cases, $c^{l_u}$ may be the sequence pool or codebook associated to the multiplexing index $l_a$. The UE 115 with UCI a may transmit the sequence $$C_{l_a}^{l_u}.$$

In some cases, one sequence pool $c'$ may be generated from another sequence pool $c$ by point-wise multiplexing each column of $c$ with a fixed-length sequence of length N. For instance, $$c_m'(n) = C_m(n) \cdot s'(n), \quad m \in \{0, \ldots, M-1\},$$
$$n \in \{0, \ldots, N-1\}$$

Thus, the UE 115 may first identify UCI sequence a, find the decimal equivalent $l_a$, use MI and choose $c^{l_u}$, and then generate the sequence $$C_{l_a}^{l_u}.$$

In the case of joint sequence pools, there may be a single sequence pool $c$ of size $M=2^{k+r}$, where $r=\log_2 K_{UE}$. One UE 115 of the set of UEs 115 using the joint sequence pool may determine an integer $l_b$ based on the UCI payload a and multiplexing index $l_u$, and the UE 115 may select the sequence $c_{l_b}$ from the codebook. There may be multiple approaches for the UE 115 to generate a sequence from multiplexing index $l_u$ (or j), and UCI a. In one case, the UE 115 may first convert $l_u$ into binary string $u=u_0, \ldots, u_{r-1}$. Then, the UE 115 may concatenate u and a and generate a new binary sequence b of length k+r. In this case, u may be prepended to a (i.e., b=[u,a]) or u may be appended to a (i.e., b=[a,u]). Then, the UE 115 may convert the binary sequence b into decimal integer $l_b$.

In another case, $l_b$ may be set such that $l_b = 2^r \cdot l_a + l_u$ or $l_b = l_a + l_u \cdot 2^k$. These options may be the same mathematically as the first approach used by a UE 115 to generate a sequence from multiplexing index $l_u$ (or j) and UCI a, but may be presented differently.

The sequence pool itself (either in the case of separate sequence pools or joint sequence pools) may be based on different designs. For example, the sequence pool may be based on Zadoff-Chu (ZC) sequences, BPSK/QPSK modulated Gold/M sequence, or DFT sequences.

In the example of DFT sequences, M be a power of 2 either $2^k$ or $2^{k+r}$. p may be a parameter which depends on either the cell ID or the multiplexing index $l_u$ (or j). A DFT-based sequence pool with parameter p be generated by sampling N rows of M×M DFT matrix $A=(A_{s,t})_{s,t=1}^M$. The element in the $s^{th}$ row and the $t^{th}$ column may given by $$A_{s,t} = \exp\left(-j \frac{2\pi(s-1)(t-1)}{M}\right).$$

The UE may determine which N rows to sample, which may mathematically be equivalent to the function $f_p(\bullet)$: $\{0, \ldots, N-1\} \mapsto \{1, \ldots, M\}$. Thus, $c_m^p(n) = A_{f_p(n), m+1}$, $m \in \{0, \ldots, M-1\}$, $n \in \{0, \ldots, N-1\}$.

For example, in the case of a DFT-based joint sequence pool, $M=2^{k+r}$, where k is the UCI payload size, and $2^r$ may denote the number of UEs 115 which may be set to be multiplexed on the same resource. $c$ may be formed by sampling N rows of an M×M DFT matrix: $A=(A_{s,t})_{s,t=1}^M$ with a sampling function $f$. For example, $$f(n) = \left(\frac{n(n+1)}{2} \bmod M\right) + 1.$$

Given a UCI payload a, and multiplexing index j, the UE 115 may determine the sequence index $l_b$, based on an indication received from a base station which may be unique to each UE 115. For example, if $l_b = 2^k l_u + l_a$, then the generated sequence may be:

$$C_{l_b}(n) = \exp\left(-2\pi j \frac{(f(n)-1)(l_b)}{2^{k+r}}\right) =$$
$$\exp\left(-2\pi j \frac{(f(n)-1)(l_a)}{2^{k+r}}\right) \exp\left(-\frac{2\pi j l_u}{2^r}(f(n)-1)\right)$$

where $$\exp\left(-\frac{2\pi j l_u}{2^r}(f(n)-1)\right)$$

is the UE-specific term.

In another example, if $l_b = 2^r l_a + l_u$, then the generated sequence may be:

$$C_{l_b}(n) = \exp\left(-2\pi j \frac{(f(n)-1)l_a}{2^k}\right) \exp\left(-2\pi j \frac{(f(n)-1)l_u}{2^{k+r}}\right)$$

where $$\exp\left(-2\pi j \frac{(f(n)-1)l_u}{2^{k+r}}\right)$$

is the UE specific term. The construction described herein may be interpreted as having a single set of sequence of cardinality M, where each UE may map its corresponding UCI to a base sequence from the set. The UE may then multiply the base sequence by a UE-specific term. This may be an example of a sequence masking technique.

In some cases, at 320 the UE 115 may perform transform precoding after the sequence is generated and before the sequence is mapped to resource elements (i.e., subcarriers in an OFDM system). If transform precoding is not applied, then the UE 115 may map the sequence in the frequency domain. If transform precoding is applied, then the UE 115 may map the sequence in the time domain. If transform precoding is applied, then it may be performed on each OFDM symbol.

For example, the PUCCH may be scheduled with one RB (e.g., 12 REs) and 14 OFDM symbols. In this case, the sequence length may be N=168. Thus, the UE 115 may map every length-12 sub-sequence into one OFDM symbol. The UE 115 may apply transform precoding (e.g., a twelve point DFT) to the length-12 sub-sequence on each OFDM symbol.

Based on generating the sequence using one or more of the sequence generating processes described herein, a UE 115 may then map the generated sequence to REs at 325. After mapping the REs, the UE 115 may transmit the generated and mapped sequence in PUCCH resources at 330, which a base station 105 may receive. The base station may then use the received sequence to determine the UCI payload by associated the uplink control sequence with a corresponding sequence index of the one or more sets of uplink control sequences.

In some cases, a UE 115 may generate a BPSK or QPSK modulated Gold sequence or an M sequence in order to communicate PUCCH information. Process diagram 302 (of FIG. 3B) may represent an example process for generating a BPSK or QPSK modulated Gold sequence or an M sequence in order to communicate PUCCH information. The BPSK modulated sequence may also be a $$\frac{\pi}{2} BPSK$$

modulated sequence. A $$\frac{\pi}{2} BPSK$$

modulated sequence may lead to a lower peak-to-average power ratio (PAPR) compared to some other modulation types.

A Gold sequence may be a type of binary pseudo-random sequence that may be used for reference signals for different applications (e.g., CMDA, LTE, NR, or other applications). The Gold sequence may be used as a synchronization signal, a DMRS, a CSI-RS, or other reference signal. The Gold or M sequence may be initialized using a seed, such as $c_{init}$. The $c_{init}$ seed may correspond to a integer, such as a 31 bit integer e.g., such that the integer has a value between 0 and $2^{31}-1$).

Some generic pseudo-random sequences may be defined by a length-31 Gold sequence. The output sequence may be a sequence c(n) of length $M_{PN}$, where n=0, 1, ..., $M_{PN}-1$ may be defined by:

$$c(n)=(x_1(n+N_c)+x_1(n+N_c)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2$$

where $N_c=1600$ and the first m-sequence, $x_1(n)$, may be initialized with $x_1(0)=1$, $x_1(n)=0$, n=1, 2, ..., 30. The initialization of the second m-sequence, $x_2(n)$, may be denoted by $c_{init}=\Sigma_{i=0}^{30} x_2(i) \cdot 2^i$ where the value may depend on the application of the sequence.

The UE 115 may convey the UCI payload using the seed (e.g., $c_{init}$) of the Gold sequence. For example, for k<31 bits, and the UCI payload of $a_0, a_1, \ldots, a_{k-1}$, $c_{init}$ may be generated such that $c_{init}=2^k \cdot n_{ID}+l_a$, where $l_a$ is the decimal value of the UCI payload. The decimal value $l_a$ of the UCI payload may be defined as $\Sigma_{i=0}^{k-1} 2^i a_i$ or $l_a=\Sigma_{i=0}^{k-1} 2^i a_{k-1-i}$, and $n_{ID}$ may determined based on a UE ID, a cell ID, or a multiplexing ID, or a combination of these. In some cases, the seed may be used to generate a binary Gold or M sequence of length 2N, which may then be QPSK modulated to generate the complex sequence for transmission. In some cases, the seed may be used to generate a binary Gold or M sequence of length N, and then use $$\frac{\pi}{2} BPSK$$

modulation to generate the complex sequence. A $$\frac{\pi}{2} BPSK$$

modulation may lead to a smaller PAPR.

In either case of Gold or M sequence generation, or of QPSK or BPSK modulation, the UE 115 may first use the UCI payload 335 to perform sequence generation process 310-b. UE may first use UCI payload 335 to determine the seed for the Gold sequence at 340. The UE 115 may then generate the Gold sequence at 345 using the generated seed. At 350, the UE 115 may perform either QPSK or $$\frac{\pi}{2} BPSK$$

modulation on the Gold sequence. In some cases, UE 115 may perform transform precoding at 320-b on the modulated sequence. Whether UE 115 performs transform precoding or does not perform transform precoding at 320-b, the UE 115 may perform RE mapping at 325-b. After RE mapping and the completion of the sequence generation, the UE 115 may transmit the PUCCH to a base station 105 at 330-b.

Figure 4:
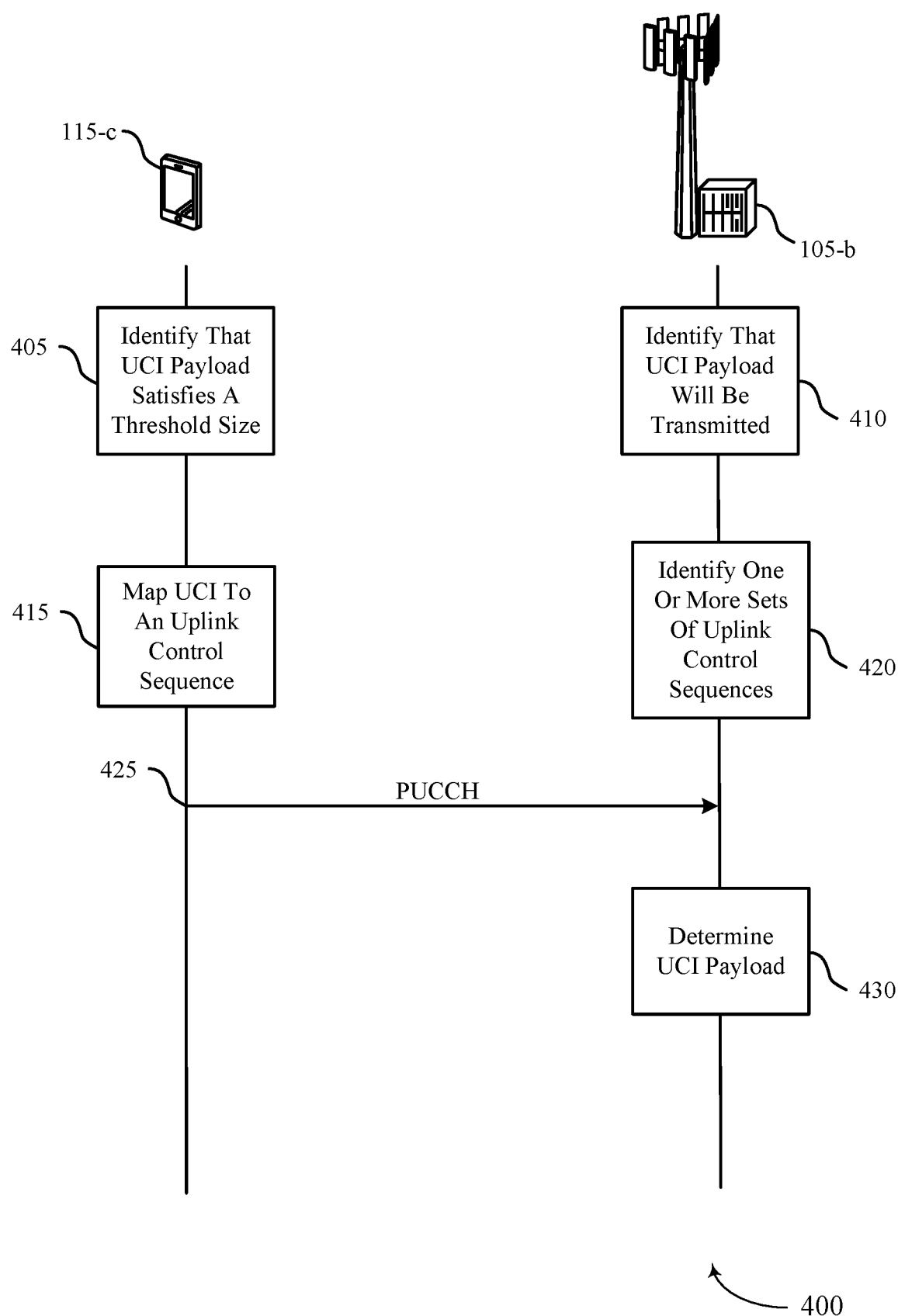
FIG. 4 illustrates an example of a process flow that supports sequence based PUCCH transmission in accordance with aspects of the present disclosure.

FIG. 4 illustrates an example of a process flow 400 that supports sequence based PUCCH transmission in accordance with aspects of the present disclosure. In some examples, process flow 400 may implement aspects of wireless communication systems 100 and 200, as well as process diagram 300. Process flow 400 may include UE 115-c, which may perform features similar to those described in reference to UEs 115, in wireless communications system 100, and UE 115-a and UE 115-b in wireless communications system 200. UE 115-b may also generate uplink control sequences according to process diagram 300. Process flow 400 may also include base station 105-b which may perform process similar to those of base stations 105 as described with respect to wireless communications systems 100 and 200.

At 405, UE 115-c may identify that an UCI payload satisfies a threshold size condition. At 410, base station 105-b may identify that an UCI payload is to be transmitted by UE 115-c as an uplink control sequence. Base station 105-b may identify that the UCI payload is to be transmitted as an uplink control sequence in cases where the UCI payload satisfies a threshold size condition.

At 415, UE 115-c may map the UCI payload to an uplink control sequence based on the UCI payload satisfying the threshold size condition. The satisfaction by the UCI payload of the threshold size condition may be based on the UCI payload being less than or equal to a predetermined maximum payload size. For example, identifying that the UCI payload satisfies the threshold size condition may include identifying that the UCI payload is less than or equal to a predetermined maximum payload size.

The mapping may include converting the UCI payload to a decimal value, and selecting the uplink control sequence from a set of uplink control sequences based on the decimal value. The number of uplink control sequences in the set of uplink control sequences may be greater than or equal to $2^k$, where k is the payload size. The selection of the uplink control sequence from the set of uplink control sequences may include selecting the uplink control sequence that is associated with the decimal value.

In some cases, UE 115-c may multiply the uplink control sequence with a signature sequence prior to transmitting the uplink control sequence at 425. For example, transmission of the uplink control sequence includes transmission of a result of multiplying the uplink control sequence and the signature sequence. UE 115-c may receive a multiplexing index from base station 105-b, and UE 115-c may generate the signature sequence based on the multiplexing index. In some cases, the uplink control sequence and the signature sequence may be the same length. The signature sequence may be associated with one of a set of transmission antennas of UE 115-c. In some cases, the signature sequence associated with the one of the set of transmission antennas may be orthogonal to other signature sequences associated with others of the set of transmission antennas of UE 115-c. In other cases, the signature sequence may be distinct to different UEs 115. For example, the signature sequence may be a UE-specific signature sequence. The UE-specific signature sequence may be applied to the selected sequence, and base station 105-b may use the signature sequence to differentiate the different PUCCHs transmitted from different UEs 115. In some cases, UEs 115 may utilize signature sequences to differentiate transmit antennas, and UEs 115 may also use signature sequences corresponding to the UE 115 to differentiate the UE 115.

UE 115-c may receive an indication that UE 115-c is to use some or all of the set of transmission antennas to transmit the PUCCH at 425. The indication may be associated with a format of the PUCCH.

UE 115-c may receive a multiplexing index from base station 105-b. The multiplexing index may be different from other multiplexing indices that may be provided to other UEs 115 that are also scheduled to transmit using resources assigned to UE 115-c for the PUCCH. UE 115-c may use the multiplexing index to map the UCI payload to the uplink control sequence. The multiplexing index may be associated with a PUCCH resource. In using the multiplexing index to map the UCI payload to the uplink control sequence, UE 115-c may select the uplink control sequence of a set of uplink control sequences based on the multiplexing index. The set of uplink control sequences may include a set of column vectors, and each column vector may be one of a set of sequences. UE 115-c may select the uplink control sequence form one of the set of column vectors of the set of uplink control sequences.

In other cases where UE 115-c uses the multiplexing index to map the UCI payload to the uplink control sequence, UE 115-b may select the uplink control sequences based on the UCI payload and the multiplexing index. The set of uplink control sequences may include a set of column vectors, and each column vector may be one or a set of sequences. The uplink control sequence may correspond to one of the set of column vectors. When selecting the uplink control sequence from the set of uplink control sequences, UE 115-c may convert the multiplexing index into a binary string. UE 115-c may then also concatenate the binary string with the UCI payload to form a concatenated string, convert the concatenated string to a decimal value, and select the uplink control sequence from the set of uplink control sequences based on the decimal value that represents the concatenated string.

In other cases, the selection of the uplink control sequence from the set of uplink control sequences includes converting the UCI information payload to a decimal value. In these cases, UE 115-c may also sum the first multiple of the decimal value representing the UCI payload with a second multiple of the multiplexing index to form a summed decimal value. UE 115-c may select the uplink control sequence from the set of uplink control sequences based on the summed decimal value. In some cases, the first multiple may be based on a number of UEs 115 scheduled to transmit using the resources assigned to UE 115-c for the PUCCH, where the number of UEs 115 may include UE 115-c and other UEs 115, and the second multiple may be one. In other cases, the first multiple may be one and the second multiple may be based on a number of bits of the UCI payload.

The mapping of the UCI payload to the uplink control sequence may also include UE 115-c selecting the uplink control sequence from one or more sets of uplink control sequences, and sequences in the one or more sets of uplink control sequences may be ZC sequences, binary or QPSK modulated Gold or M sequences, or DFT-based sequences. The one or more sets of uplink control sequences may include DFT-based sequences which may be based on a deterministic sampling of row entries in a selected column of a DFT matrix in accordance with a sampling function. In other cases, the one or more sets of uplink control sequences include inverse discrete Fourier transform (IDFT)-based sequences which may be based on a deterministic sampling of row entries in a selected column of an IDFT matrix in accordance with a sampling function.

UE 115-c may apply a transform precoding operation to the uplink control sequence, and may map the uplink control sequence to frequency domain resources after application of the transform precoding operation and prior to transmission of the PUCCH. In other cases, UE 115-c may refrain from applying a transform precoding operation to the uplink control sequence, and UE 115-c may map the uplink control sequence to time domain resources prior to transmission of the PUCCH. For example the uplink control sequence may be non-transform precoded.

In some cases, UE 115-c may select an uplink control sequence using a BPSK or QPSK modulated Gold or M sequence. In this case, UE 115-c may generate a seed for a BPSK or QPSK modulated Gold or M sequence based on the UCI payload. UE 115-c may select the BPSK or QPSK modulated Gold or M sequence based on the generated seed. UE 115-c may map the UCI payload to the seed, and may selected the BPSK or QPSK modulated Gold or M sequence based on the mapping. The generation of the seed may include UE 115-c generating the seed based on the UCI payload and a UE ID, a cell ID, or a multiplexing index, or a combination of these.

In some cases, UE 115-c may receive the multiplexing index from base station 150-b, where the multiplexing index may be different from other multiplexing indices provided to other UEs 115 also scheduled to transmit using resources assigned to UE 1115-c for the PUCCH. UE 115-c may use the multiplexing index to map the UCI payload to generate the seed. To use the multiplexing index to map the UCI payload to generate the seed, UE 115-c may convert the multiplexing index to a binary string, concatenate the binary string with the UCI payload to form a concatenated string, convert the concatenated string to a decimal value, and generate the seed based on the decimal value representing the concatenated string. UE 115-c may also convert the UCI payload to a decimal value, sum the first multiple of the decimal value representing the UCI payload with a second multiple of the multiplexing index to forma a summed decimal value, and generate the seed based on the summed decimal value.

At 420, base station 105-b may identify one or more sets of uplink control sequences from which the uplink control sequence is to be selected by UE 115-c.

At 425, UE 115-c may transmit a PUCCH that includes the uplink control sequence. The uplink control sequence may be representative of the UCI payload. Base station 105-b may receive the PUCCH that include the uplink control sequence. The transmission of the PUCCH may include transmitting the uplink control sequence as a non-coherent transmission without a DMRS.

These implementations may allow UE 115-c to save power and increase battery life by decreasing the number of retransmissions of a UCI for particular applications by improving the performance of PUCCH reception at a base station 105-b. Additionally, actions performed by the UE 115-c may also improve reliability of service at the corresponding UE 115-c, by improving the efficiency of transmission of UCI and the corresponding channel quality information provided in the UCI.

At 430, base station 105-b may determine the UCI payload by associated the uplink control sequence with a corresponding sequence index of the one or more sets of uplink control sequences. The sequence index may be a decimal value of the UCI payload. The determination of the UCI payload may include base station 105-b identifying that the uplink control sequence has been multiplied with a signature sequence prior to the transmission of the uplink control sequence. The signature sequence and the uplink control sequence prior to multiplication with the signature sequence may be of a same length. The signature sequence may be associated with one of a set of transmission antennas of UE 115-c. In some cases, base station 105-b may transmit an indication that UE 115-c is to use some or all of the set of transmission antennas in transmitting the PUCCH. The indication may be associated with a format of the PUCCH. Base station 105-b may transmit a multiplexing index to UE 115-c, where the multiplexing index may be different from other multiplexing indices that may be provided to other UEs 115 that may also be scheduled to transmit using resources assigned to UE 115-c for the PUCCH. The multiplexing index may be associated with a PUCCH. The one or more sets of uplink control sequences of a set of sets of uplink control sequences, and the set of uplink control sequences may correspond to the multiplexing index. Further, the one or more sets of uplink control resources from which the uplink control sequence is selected may be common to UE 115-c and to the other UEs 115.

Figure 5:
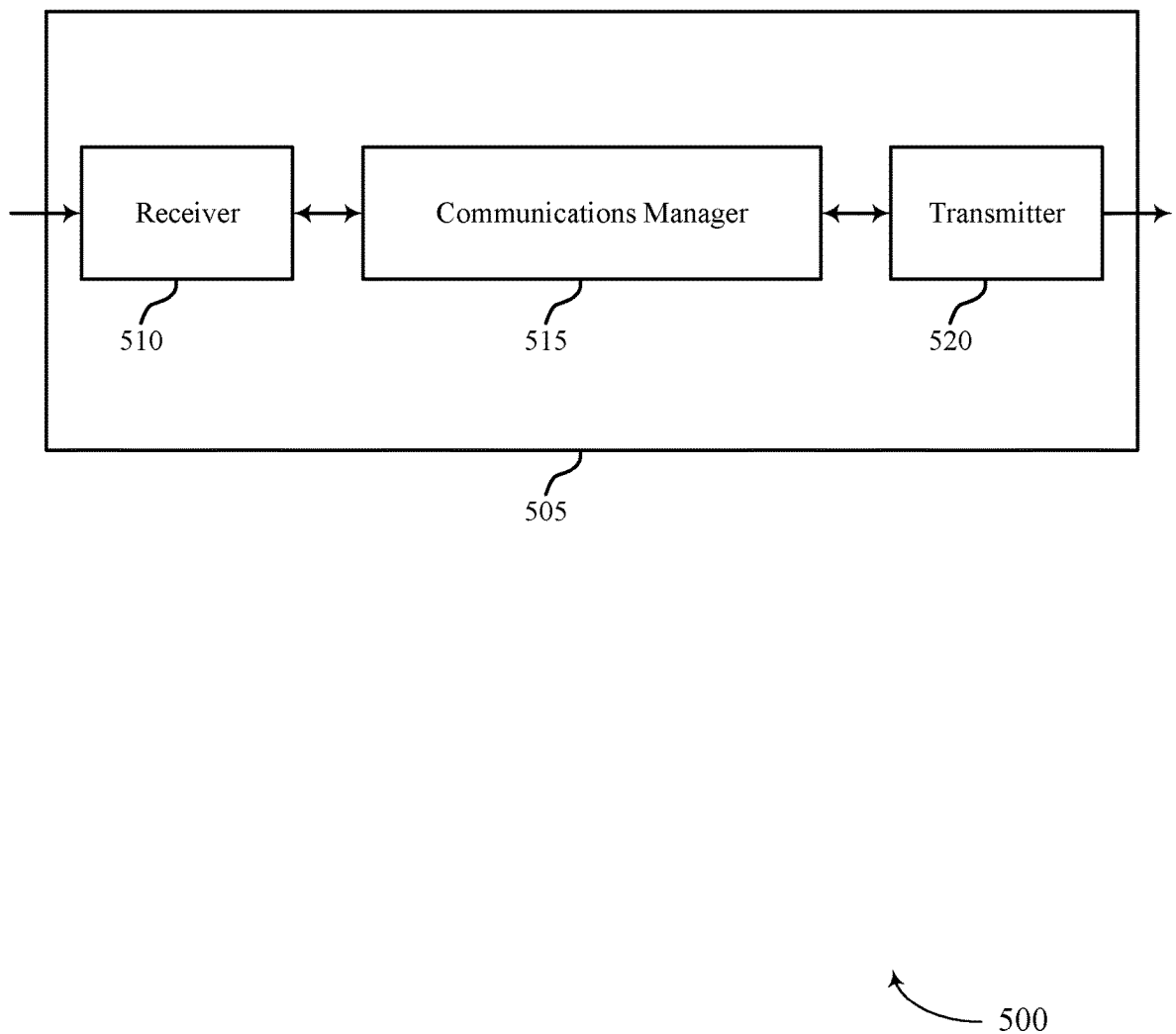
FIGS. 5 and 6 show block diagrams of devices that support sequence based PUCCH transmission in accordance with aspects of the present disclosure.

FIG. 5 shows a block diagram 500 of a device 505 that supports sequence based PUCCH transmission in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to sequence based PUCCH transmission, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may identify that an UCI payload satisfies a threshold size condition, map the UCI payload to an uplink control sequence based on the UCI payload satisfying the threshold size condition, and transmit a PUCCH that includes the uplink control sequence, the uplink control sequence being representative of the UCI payload. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

In some examples, the communications manager 515 described herein may be implemented as a chipset of a wireless modem, and the receiver 510 and the transmitter 520 may be implemented as sets of analog components (e.g., amplifiers, filters, phase shifters, antennas, etc.) The wireless modem may obtain and decode signals from the receiver 510 over a receive interface, and may output signals for transmission to the transmitter 520 over a transmit interface.

The actions performed by communications manager 515 described herein may be implemented to realize one or more potential advantages. One implementation may allow a UE 115 to save power and increase battery life by decreasing the number of retransmissions of a UCI for particular applications by improving the performance of PUCCH reception at a base station 105. Additionally, actions performed by communications manager 515 may also improve reliability of service at the corresponding UE 115, by improving the efficiency of transmission of UCI and the corresponding channel quality information provided in the UCI.

Figure 6:
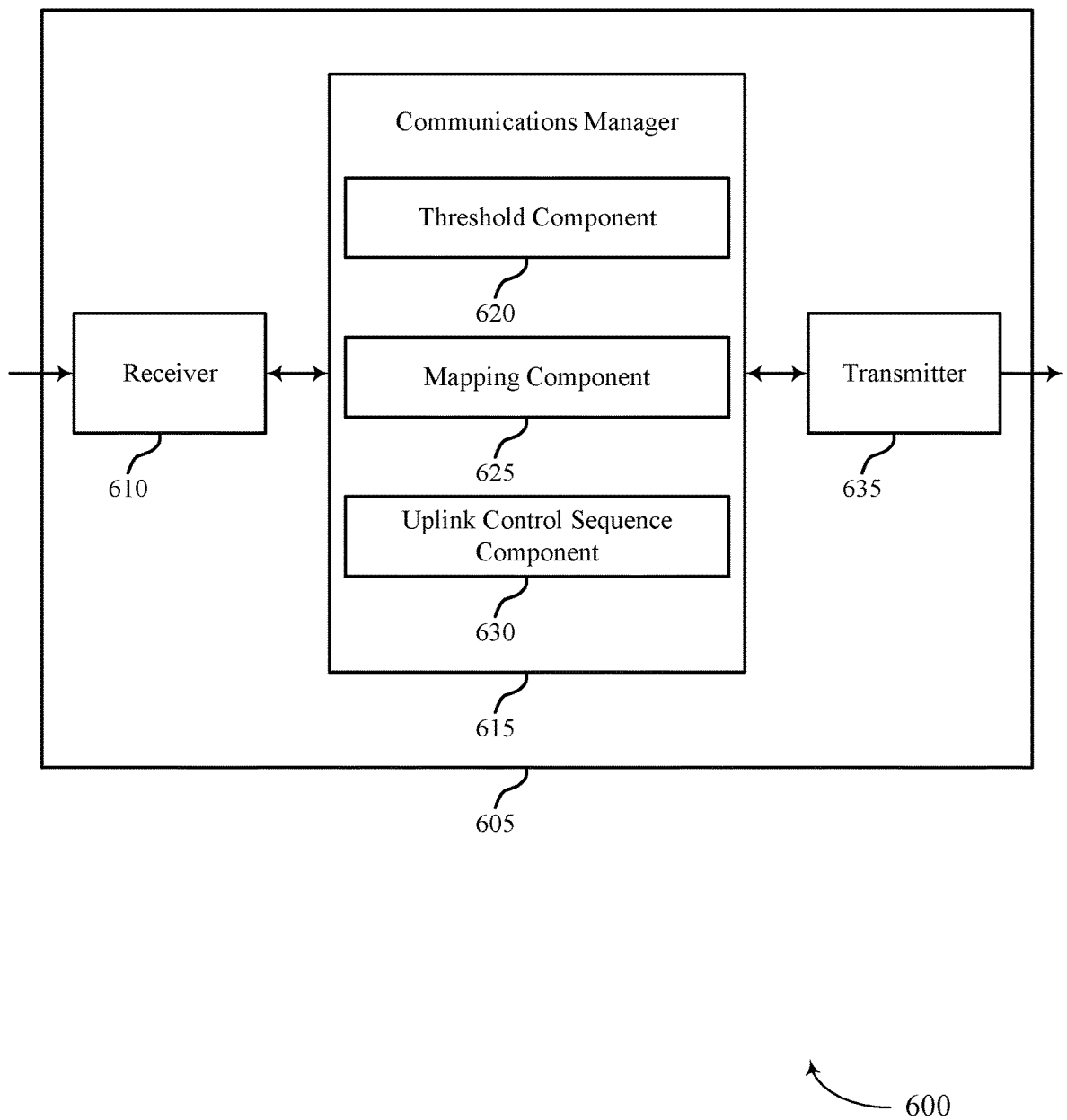

FIG. 6 shows a block diagram 600 of a device 605 that supports sequence based PUCCH transmission in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to sequence based PUCCH transmission, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a threshold component 620, a mapping component 625, and an uplink control sequence component 630. The communications manager 615 may be an example of aspects of the communications manager 810 described herein.

The threshold component 620 may identify that an UCI payload satisfies a threshold size condition. The mapping component 625 may map the UCI payload to an uplink control sequence based on the UCI payload satisfying the threshold size condition. The uplink control sequence component 630 may transmit a PUCCH that includes the uplink control sequence, the uplink control sequence being representative of the UCI payload.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

A processor of a UE 115 (e.g., controlling the receiver 610, the transmitter 635, or a transceiver 820) may efficiently determine that a UCI payload satisfies a threshold size condition. The processor of the UE 115 may turn on one or more processing units in order to map the UCI payload to an uplink control sequence, in order to utilize sequence-based transmission. The processor of the UE 115 may also operate transmitter 635 to transmit the generated uplink control sequence, which may be transmitted to a base station 105. The operations of the processor may improve efficiency of the UE 115 by improving the performance of PUCCH reception, in cases of low SNR and other cases.

Figure 7:
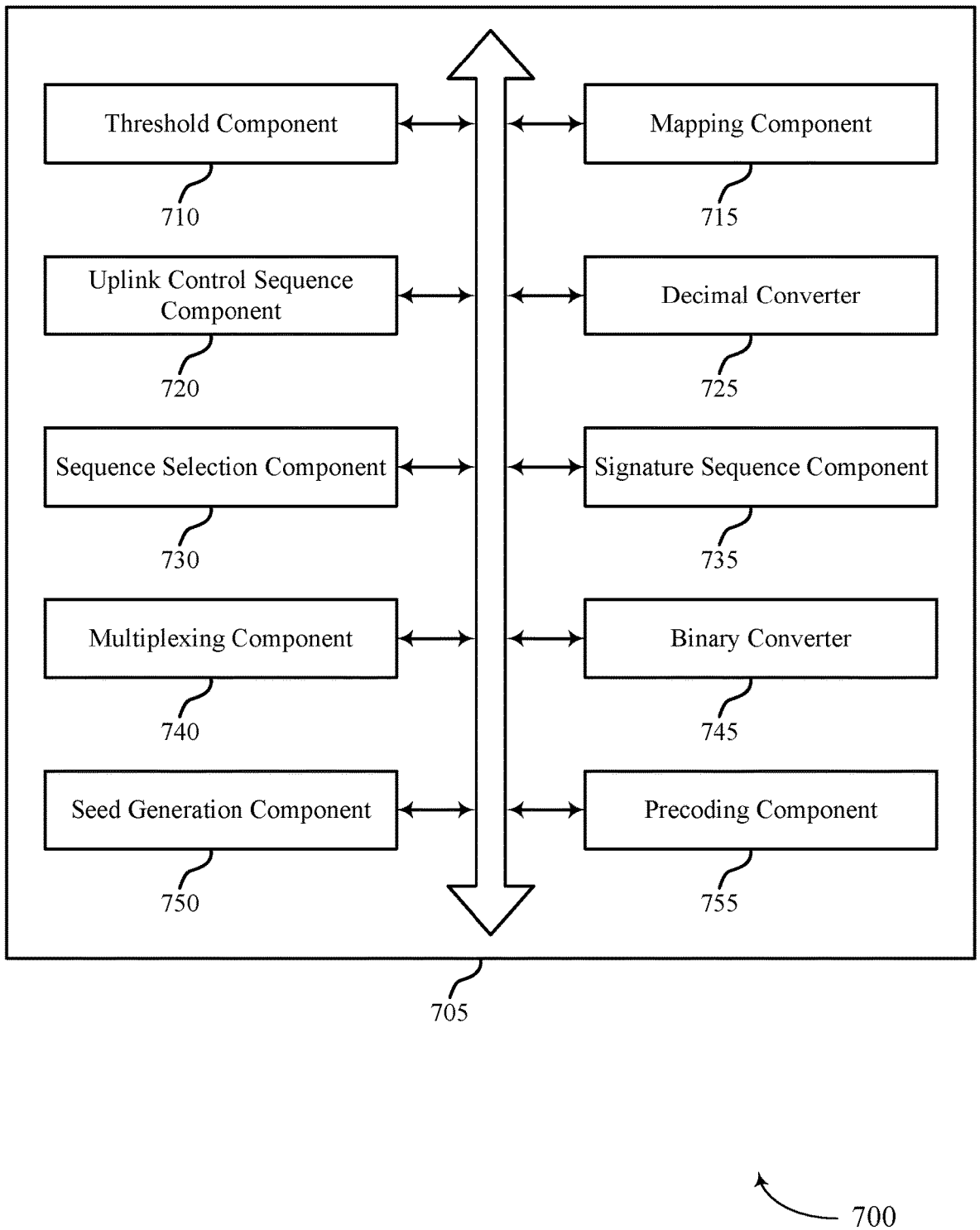
FIG. 7 shows a block diagram of a communications manager that supports sequence based PUCCH transmission in accordance with aspects of the present disclosure.

FIG. 7 shows a block diagram 700 of a communications manager 705 that supports sequence based physical uplink control channel transmission in accordance with aspects of the present disclosure. The communications manager 705 may be an example of aspects of a communications manager 515, a communications manager 615, or a communications manager 810 described herein. The communications manager 705 may include a threshold component 710, a mapping component 715, an uplink control sequence component 720, a decimal converter 725, a sequence selection component 730, a signature sequence component 735, a multiplexing component 740, a binary converter 745, a seed generation component 750, and a precoding component 755. Each of these modules may communicate, directly or indirectly, with one another (e.g., via one or more buses).

The threshold component 710 may identify that an UCI payload satisfies a threshold size condition. In some examples, the threshold component 710 may satisfaction by the UCI payload of the threshold size condition is based on the UCI payload being less than or equal to a predetermined maximum payload size. The threshold component 710 may identify that the UCI payload is less than or equal to a predetermined maximum payload size.

The mapping component 715 may map the UCI payload to an uplink control sequence based on the UCI payload satisfying the threshold size condition. In some examples, the mapping component 715 may map the UCI payload to the seed. In some examples, the mapping component 715 may use the multiplexing index to map the UCI payload to generate the seed. In some examples, the mapping component 715 may map the uplink control sequence to frequency domain resources after application of the transform precoding operation and prior to transmission of the physical uplink control channel. In some examples, the mapping component 715 may map the uplink control sequence to frequency domain resources prior to transmission of the physical uplink control channel, where the uplink control sequence is non-transform precoded.

The uplink control sequence component 720 may transmit a physical uplink control channel that includes the uplink control sequence, the uplink control sequence being representative of the UCI payload. In some examples, the uplink control sequence component 720 may transmit the uplink control sequence as a non-coherent transmission without a demodulation reference signal.

The decimal converter 725 may convert the UCI payload to a decimal value. In some examples, the decimal converter 725 may convert the concatenated string to a decimal value. In some examples, the decimal converter 725 may convert the UCI payload to a decimal value. In some examples, the decimal converter 725 may sum a first multiple of the decimal value representing the UCI payload with a second multiple of the multiplexing index to form a summed decimal value.

In some cases, the first multiple is based on a quantity of UEs scheduled to transmit using the resources assigned to the UE for the physical uplink control channel, where the quantity of UEs includes the UE and the other UEs, and where the second multiple is one. In some cases, the first multiple is one and the second multiple is based on a quantity of bits of the UCI payload.

The sequence selection component 730 may select the uplink control sequence from a set of uplink control sequences based on the decimal value. In some examples, the sequence selection component 730 may select the uplink control sequence that is associated with the decimal value. In some examples, the sequence selection component 730 may select a set of uplink control sequences from a set of sets of uplink control sequences based on the multiplexing index. In some examples, the sequence selection component 730 may select the uplink control sequence from the set of uplink control sequences. In some examples, the sequence selection component 730 may select the uplink control sequence from a set of uplink control sequences based on the UCI payload and the multiplexing index. In some examples, the sequence selection component 730 may select the uplink control sequence from the set of uplink control sequences based on the decimal value representing the concatenated string.

In some examples, the sequence selection component 730 may select the uplink control sequence from the set of uplink control sequences based on the summed decimal value. In some examples, the sequence selection component 730 may select the uplink control sequence from one or more sets of uplink control sequences, where sequences in the one or more sets of uplink control sequences are ZC sequences, binary or quadrature phase shift keying modulated Gold or M sequences, or discrete Fourier transform-based sequences. The binary or quadrature phase shift keying modulated Gold or M sequences are n/2 binary or quadrature phase shift keying modulated Gold or M sequences. In some examples, the sequence selection component 730 may select the binary or quadrature phase shift keying modulated Gold or M sequence based on the generated seed. In some examples, the sequence selection component 730 may select the binary or quadrature phase shift keying modulated Gold or M sequence based on the mapping. In some cases, a quantity of uplink control sequences in the set of uplink control sequences is greater than or equal to $2^k$, where k is a payload size.

In some cases, the one or more sets of uplink control sequences include discrete Fourier transform-based sequences which are based on a deterministic sampling of row entries in a selected column of a discrete Fourier transform matrix in accordance with a sampling function. In some cases, the one or more sets of uplink control sequences include inverse discrete Fourier transform-based sequences which are based on a deterministic sampling of row entries in a selected column of an inverse discrete Fourier transform matrix in accordance with a sampling function.

The signature sequence component 735 may multiply the uplink control sequence with a signature sequence where transmission of the uplink control sequence includes transmission of the multiplied uplink control sequence with the signature sequence. In some examples, the signature sequence component 735 may receive a multiplexing index from a base station, and may generate the signature sequence based on the multiplexing index. In some examples, the signature sequence component 735 may receive an indication that the UE is to use some or all of the set of transmission antennas in transmitting the physical uplink control channel. In some cases, the signature sequence is associated with one of a set of transmission antennas of the UE. In some cases, the signature sequence associated with the one of the set of transmission antennas is orthogonal to other signature sequences associated with others of the set of transmission antennas of the UE.

In some cases, the uplink control sequence and the signature sequence are of a same length. In some cases, the indication includes an indication of a format of the physical uplink control channel. In some cases, the signature sequence is associated with the UE or with a physical uplink control channel resource that the UE uses to transmit the physical uplink control channel.

The multiplexing component 740 may receive a multiplexing index from a base station, where the multiplexing index is different from other multiplexing indices provided to other UEs also scheduled to transmit using resources assigned to the UE for the physical uplink control channel. In some examples, the multiplexing component 740 may use the multiplexing index to map the UCI payload to the uplink control sequence.

In some examples, the multiplexing component 740 may receive the multiplexing index from a base station, where the multiplexing index is different from other multiplexing indices provided to other UEs also scheduled to transmit using resources assigned to the UE for the physical uplink control channel. In some examples, the multiplexing component 740 may convert the multiplexing index into a binary string. In some cases, the multiplexing index is associated with a physical uplink control channel resource.

The binary converter 745 may convert the multiplexing index into a binary string. In some examples, the binary converter 745 may concatenate the binary string with the UCI payload to form a concatenated string.

The seed generation component 750 may generate a seed for a binary or quadrature phase shift keying modulated Gold or M sequence, based on the UCI payload. In some examples, the seed generation component 750 may generate the seed based on the UCI payload and a UE identifier, a cell identifier, or a multiplexing index, or a combination thereof. In some examples, the seed generation component 750 may generate the seed based on the decimal value representing the concatenated string. In some examples, the seed generation component 750 may generate the seed based on the summed decimal value.

The precoding component 755 may apply a transform precoding operation to the uplink control sequence.

Figure 8:
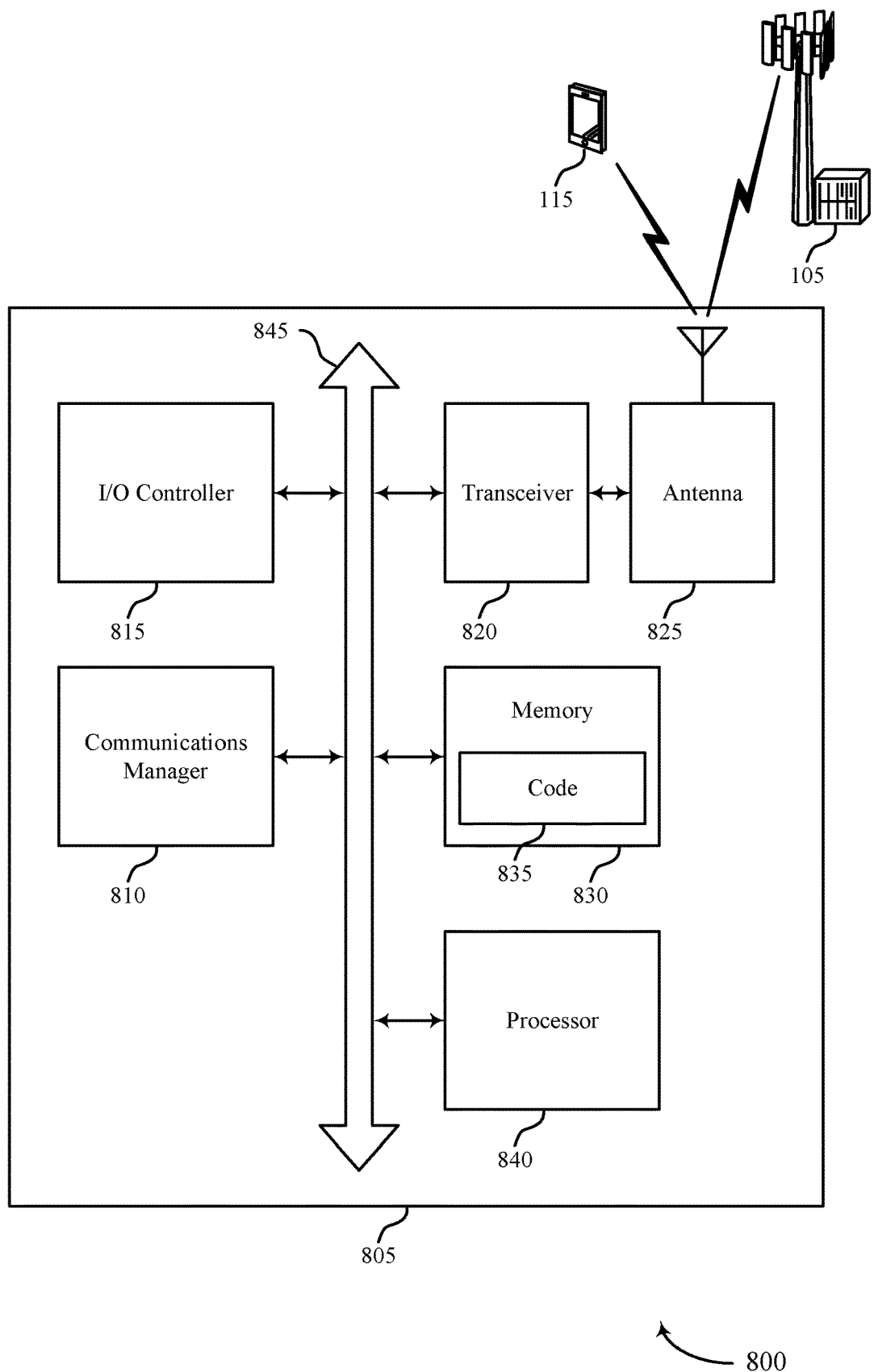
FIG. 8 shows a diagram of a system including a device that supports sequence based PUCCH transmission in accordance with aspects of the present disclosure.

FIG. 8 shows a diagram of a system 800 including a device 805 that supports sequence based PUCCH transmission in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may identify that an UCI payload satisfies a threshold size condition, map the UCI payload to an uplink control sequence based on the UCI payload satisfying the threshold size condition, and transmit a PUCCH that includes the uplink control sequence, the uplink control sequence being representative of the UCI payload.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting sequence based PUCCH transmission).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
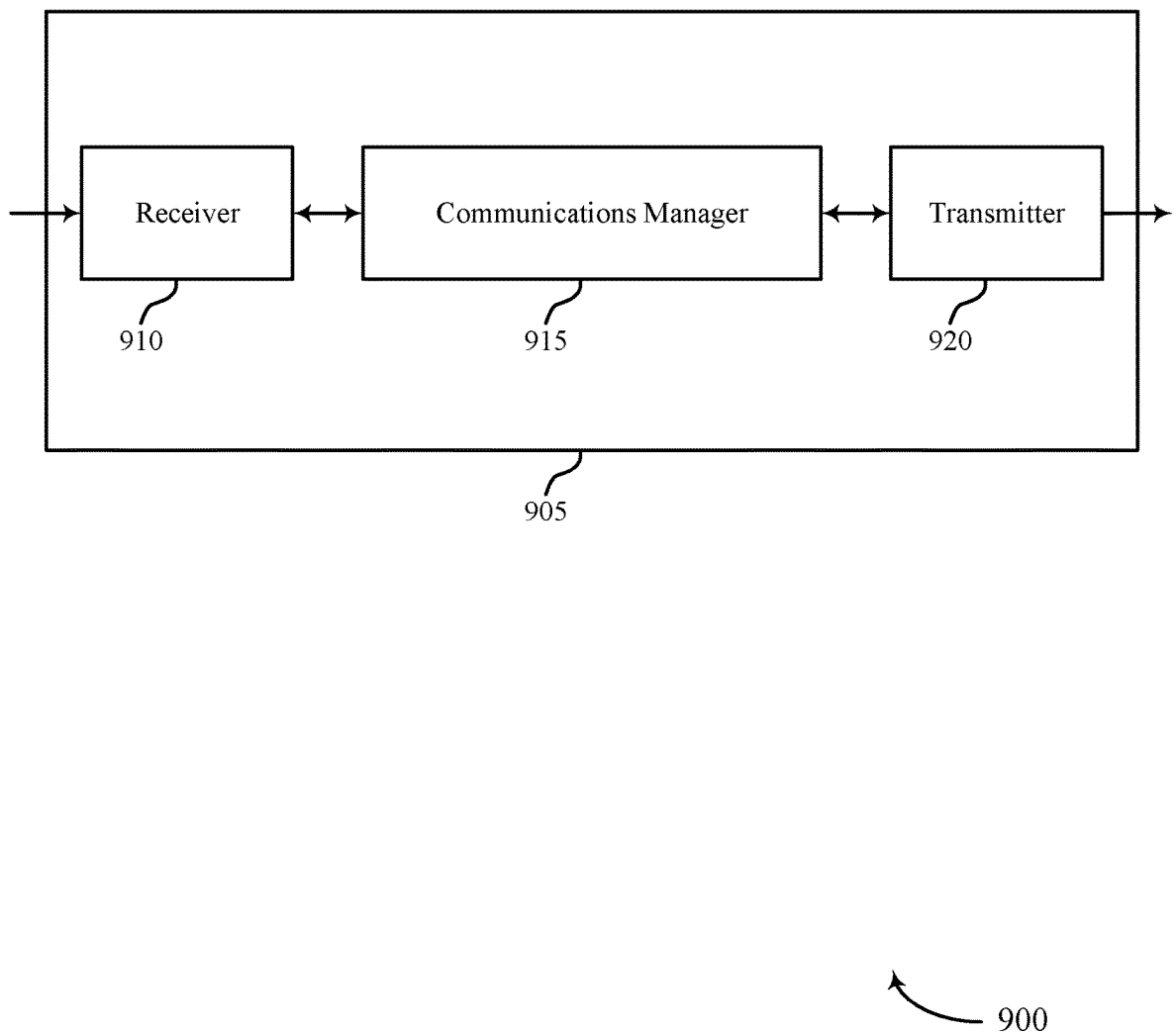
FIGS. 9 and 10 show block diagrams of devices that support sequence based PUCCH transmission in accordance with aspects of the present disclosure.

FIG. 9 shows a block diagram 900 of a device 905 that supports sequence based PUCCH transmission in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to sequence based PUCCH transmission, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify that an UCI payload is to be transmitted by a UE as an uplink control sequence when the UCI payload satisfies a threshold size condition, identify one or more sets of uplink control sequences from which the uplink control sequence is to be selected by the UE, receive a PUCCH that includes the uplink control sequence, the uplink control sequence being representative of the UCI payload, and determine the UCI payload by associating the uplink control sequence with a corresponding sequence index of the one or more sets of uplink control sequences. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
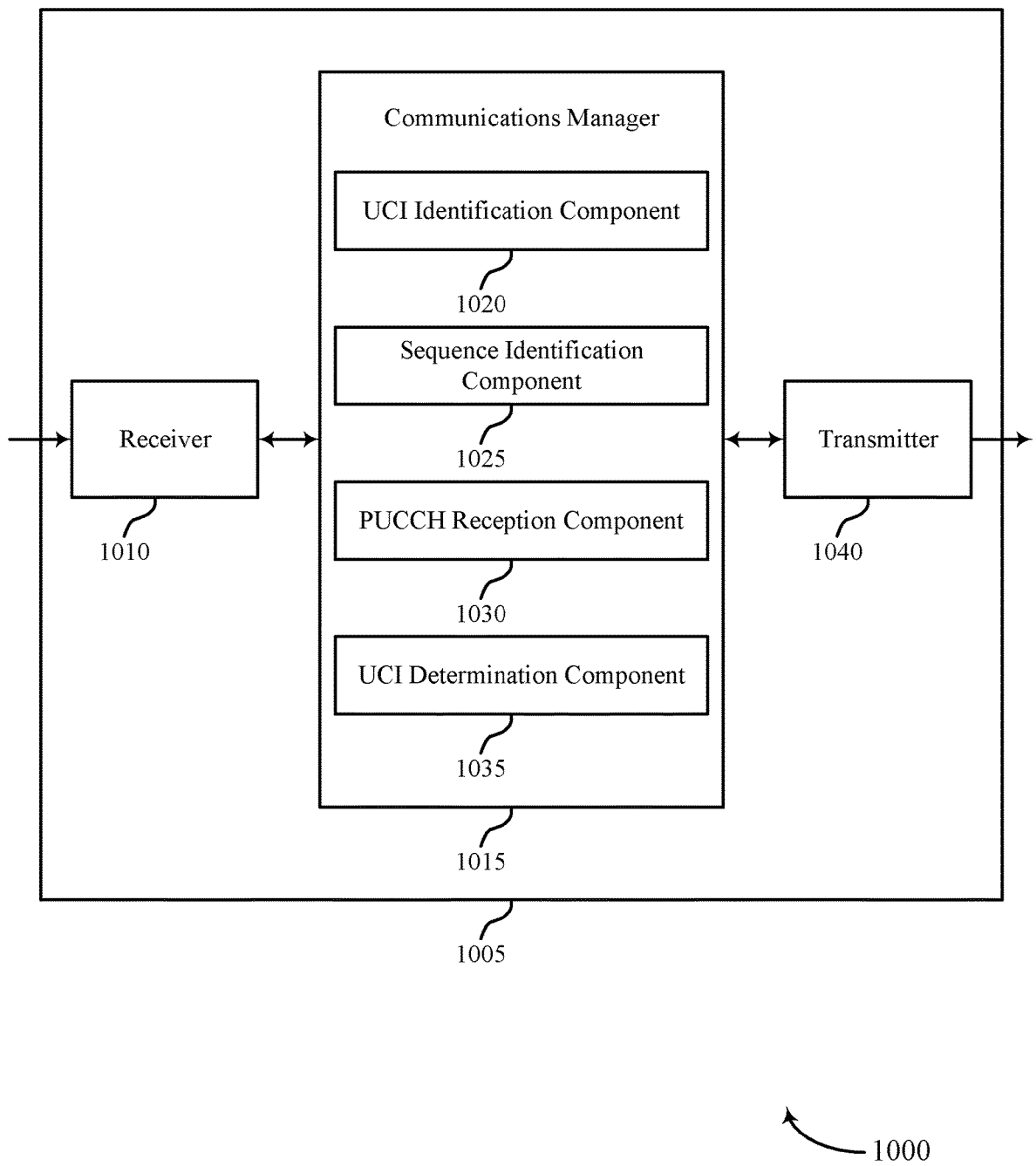

FIG. 10 shows a block diagram 1000 of a device 1005 that supports sequence based PUCCH transmission in accordance with aspects of the present disclosure. The device 1005 may be an example of aspects of a device 905, or a base station 105 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to sequence based PUCCH transmission, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include an UCI identification component 1020, a sequence identification component 1025, a PUCCH reception component 1030, and an UCI determination component 1035. The communications manager 1015 may be an example of aspects of the communications manager 1210 described herein.

The UCI identification component 1020 may identify that an UCI payload is to be transmitted by a UE as an uplink control sequence when the UCI payload satisfies a threshold size condition. The sequence identification component 1025 may identify one or more sets of uplink control sequences from which the uplink control sequence is to be selected by the UE.

The PUCCH reception component 1030 may receive a PUCCH that includes the uplink control sequence, the uplink control sequence being representative of the UCI payload. The UCI determination component 1035 may determine the UCI payload by associating the uplink control sequence with a corresponding sequence index of the one or more sets of uplink control sequences.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
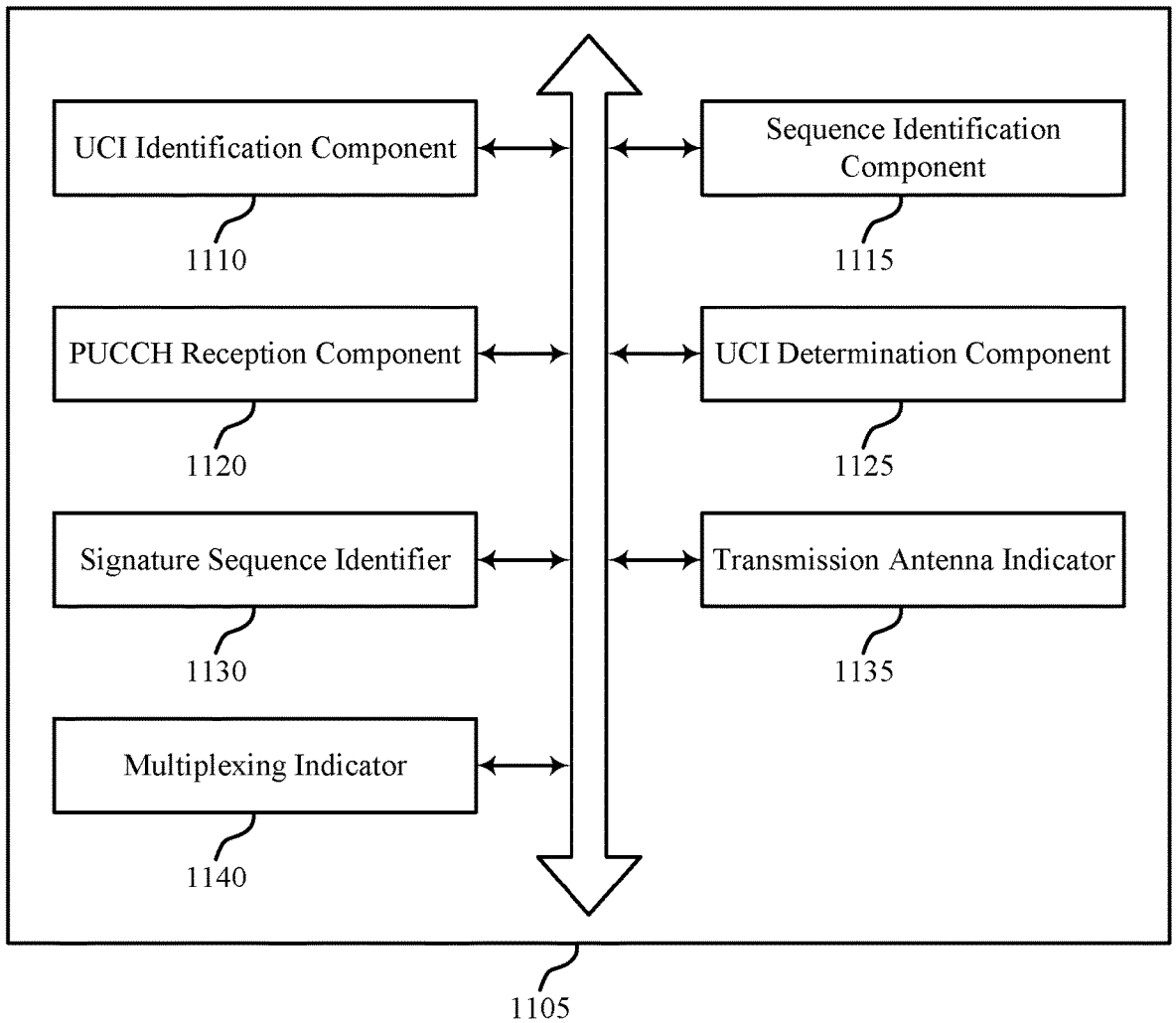
FIG. 11 shows a block diagram of a communications manager that supports sequence based PUCCH transmission in accordance with aspects of the present disclosure.

FIG. 11 shows a block diagram 1100 of a communications manager 1105 that supports sequence based PUCCH transmission in accordance with aspects of the present disclosure. The communications manager 1105 may be an example of aspects of a communications manager 915, a communications manager 1015, or a communications manager 1210 described herein. The communications manager 1105 may include an UCI identification component 1110, a sequence identification component 1115, a PUCCH reception component 1120, an UCI determination component 1125, a signature sequence identifier 1130, a transmission antenna indicator 1135, and a multiplexing indicator 1140. Each of these modules may communicate, directly or indirectly, with one another (e.g., via one or more buses).

The UCI identification component 1110 may identify that an UCI payload is to be transmitted by a UE as an uplink control sequence when the UCI payload satisfies a threshold size condition.

In some examples, satisfaction by the UCI payload of the threshold size condition is based on the UCI payload being less than or equal to a predetermined maximum payload size. The UCI identification component 1110 may identify that the UCI payload is less than or equal to a predetermined maximum payload size.

The sequence identification component 1115 may identify one or more sets of uplink control sequences from which the uplink control sequence is to be selected by the UE.

In some cases, the one or more sets of uplink control resources from which the uplink control sequence is selected includes sequences that are ZC sequences, binary or quadrature phase shift keying modulated Gold or M sequences, discrete Fourier transform-based sequences, or inverse discrete Fourier transform-based sequences.

The PUCCH reception component 1120 may receive a PUCCH that includes the uplink control sequence, the uplink control sequence being representative of the UCI payload. In some examples, the PUCCH reception component 1120 may receive the uplink control sequence as a non-coherent transmission without a demodulation reference signal.

The UCI determination component 1125 may determine the UCI payload by associating the uplink control sequence with a corresponding sequence index of the one or more sets of uplink control sequences. In some cases, the sequence index is a decimal value of the UCI payload.

The signature sequence identifier 1130 may identify that the uplink control sequence has been multiplied with a signature sequence prior to transmission of the uplink control sequence. The signature sequence and the uplink control sequence prior to multiplication with the signature sequence may be of a same length. In some cases, the signature sequence is associated with one of a set of transmission antennas of the UE. In some cases, the signature sequence associated with the one of the set of transmission antennas is orthogonal to other signature sequences associated with others of the set of transmission antennas of the UE. In some cases, the signature sequence and the uplink control sequence prior to multiplication with the signature sequence are of a same length.

The transmission antenna indicator 1135 may transmit an indication that the UE is to use some or all of the set of transmission antennas in transmitting the PUCCH. In some cases, the indication includes an indication of a format of the PUCCH.

The multiplexing indicator 1140 may transmit a multiplexing index to the UE, where the multiplexing index is different from other multiplexing indices provided to other UEs also scheduled to transmit using resources assigned to the UE for the PUCCH. In some cases, the multiplexing index is associated with a PUCCH resource.

In some cases, the one or more sets of uplink control sequences from which the uplink control sequence is selected is a set of uplink control sequences of a set of sets of uplink control sequences, the set of uplink control sequences corresponding to the multiplexing index. In some cases, the one or more sets of uplink control resources from which the uplink control sequence is selected is common to the UE and to the other UEs.

Figure 12:
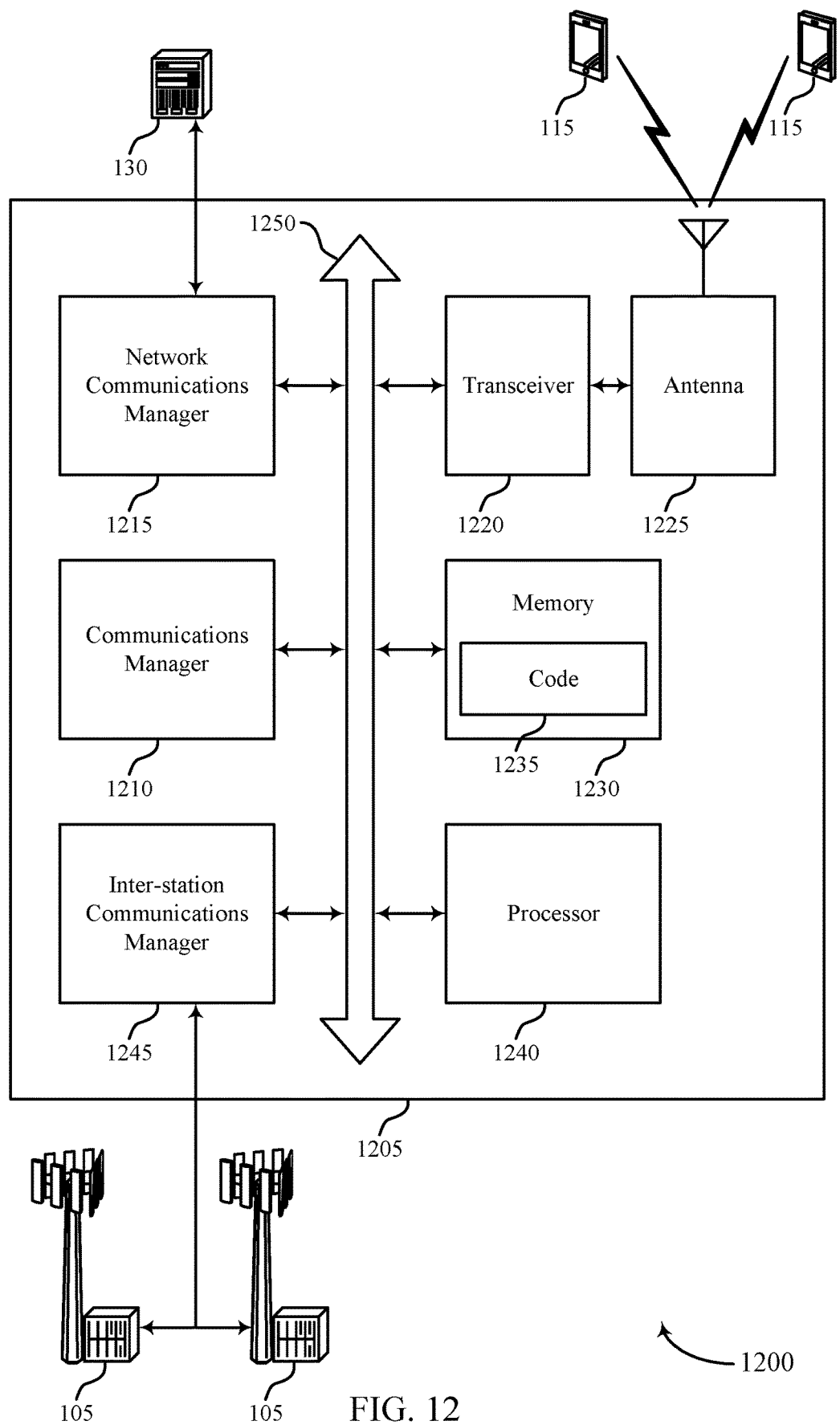
FIG. 12 shows a diagram of a system including a device that supports sequence based PUCCH transmission in accordance with aspects of the present disclosure.

FIG. 12 shows a diagram of a system 1200 including a device 1205 that supports sequence based PUCCH transmission in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may identify that an UCI payload is to be transmitted by a UE as an uplink control sequence when the UCI payload satisfies a threshold size condition, identify one or more sets of uplink control sequences from which the uplink control sequence is to be selected by the UE, receive a PUCCH that includes the uplink control sequence, the uplink control sequence being representative of the UCI payload, and determine the UCI payload by associating the uplink control sequence with a corresponding sequence index of the one or more sets of uplink control sequences.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting sequence based PUCCH transmission).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
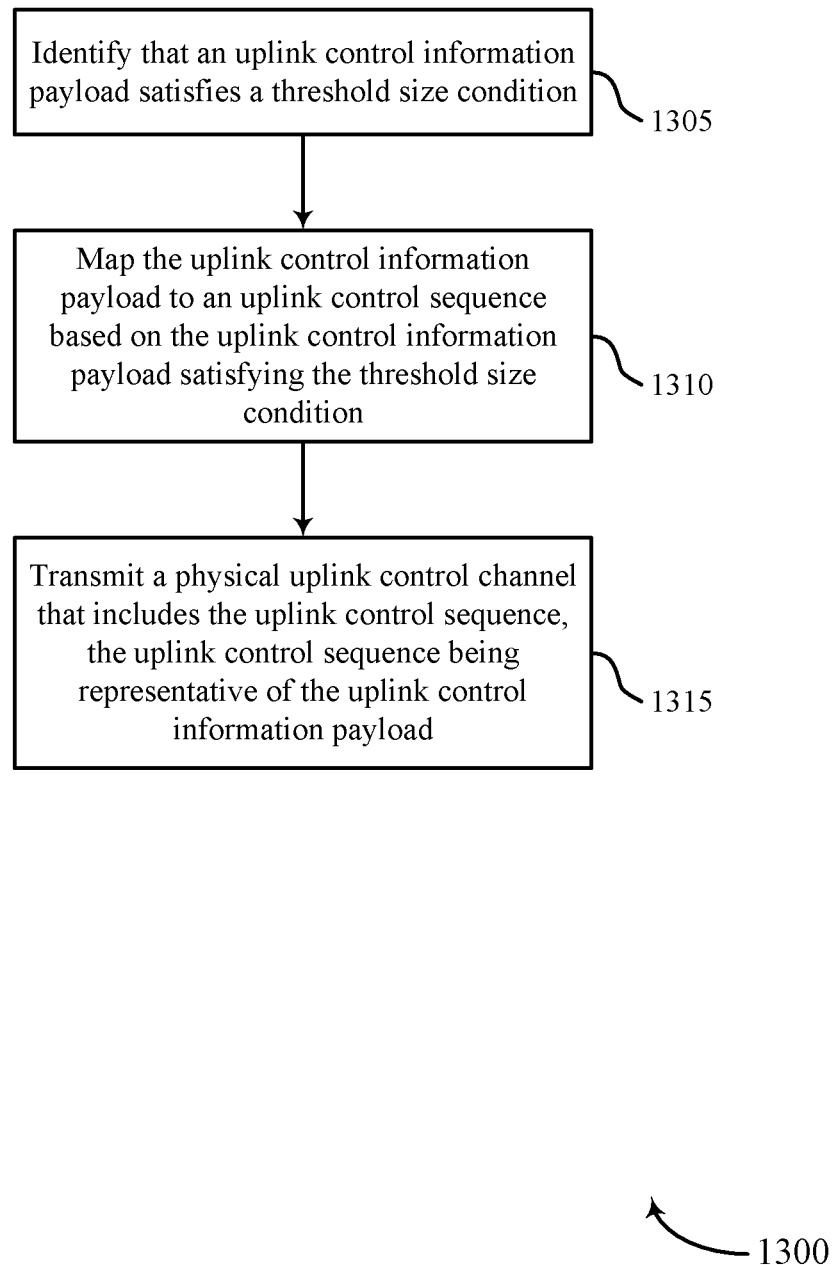
FIGS. 13 through 16 show flowcharts illustrating methods that support sequence based PUCCH transmission in accordance with aspects of the present disclosure.

FIG. 13 shows a flowchart illustrating a method 1300 that supports sequence based PUCCH transmission in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1305, the UE may identify that an UCI payload satisfies a threshold size condition. The operations of 1305 may be performed according to the methods described herein. In some examples, aspects of the operations of 1305 may be performed by a threshold component as described with reference to FIGS. 5 through 8.

At 1310, the UE may map the UCI payload to an uplink control sequence based on the UCI payload satisfying the threshold size condition. The operations of 1310 may be performed according to the methods described herein. In some examples, aspects of the operations of 1310 may be performed by a mapping component as described with reference to FIGS. 5 through 8.

At 1315, the UE may transmit a PUCCH that includes the uplink control sequence, the uplink control sequence being representative of the UCI payload. The operations of 1315 may be performed according to the methods described herein. In some examples, aspects of the operations of 1315 may be performed by an uplink control sequence component as described with reference to FIGS. 5 through 8.

Figure 14:
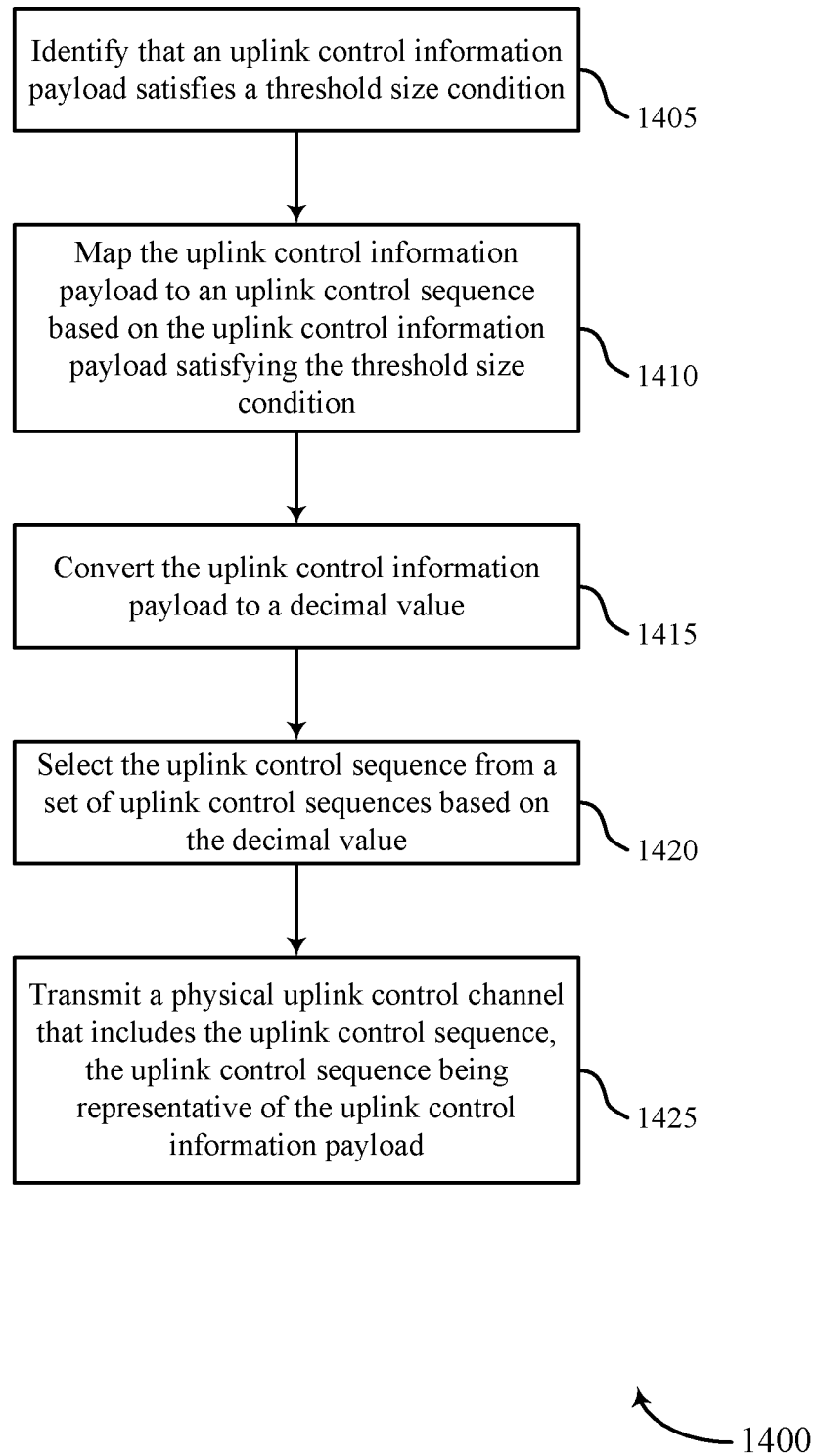

FIG. 14 shows a flowchart illustrating a method 1400 that supports sequence based PUCCH transmission in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1405, the UE may identify that an UCI payload satisfies a threshold size condition. The operations of 1405 may be performed according to the methods described herein. In some examples, aspects of the operations of 1405 may be performed by a threshold component as described with reference to FIGS. 5 through 8.

At 1410, the UE may map the UCI payload to an uplink control sequence based on the UCI payload satisfying the threshold size condition. The operations of 1410 may be performed according to the methods described herein. In some examples, aspects of the operations of 1410 may be performed by a mapping component as described with reference to FIGS. 5 through 8.

At 1415, the UE may convert the UCI payload to a decimal value. The operations of 1415 may be performed according to the methods described herein. In some examples, aspects of the operations of 1415 may be performed by a decimal converter as described with reference to FIGS. 5 through 8.

At 1420, the UE may select the uplink control sequence from a set of uplink control sequences based on the decimal value. The operations of 1420 may be performed according to the methods described herein. In some examples, aspects of the operations of 1420 may be performed by a sequence selection component as described with reference to FIGS. 5 through 8.

At 1425, the UE may transmit a PUCCH that includes the uplink control sequence, the uplink control sequence being representative of the UCI payload. The operations of 1425 may be performed according to the methods described herein. The sequence-based coding process used by the UE to transmit the PUCCH may utilize non-coherent transmission, as there may not be a DMRS transmitted along with the UCI in the PUCCH. Thus, channel estimation may not be required by the receiver. Therefore, the performance of the sequence based noncoherent transmission may not rely on the quality of channel estimation. In some examples, aspects of the operations of 1425 may be performed by an uplink control sequence component as described with reference to FIGS. 5 through 8.

Figure 15:
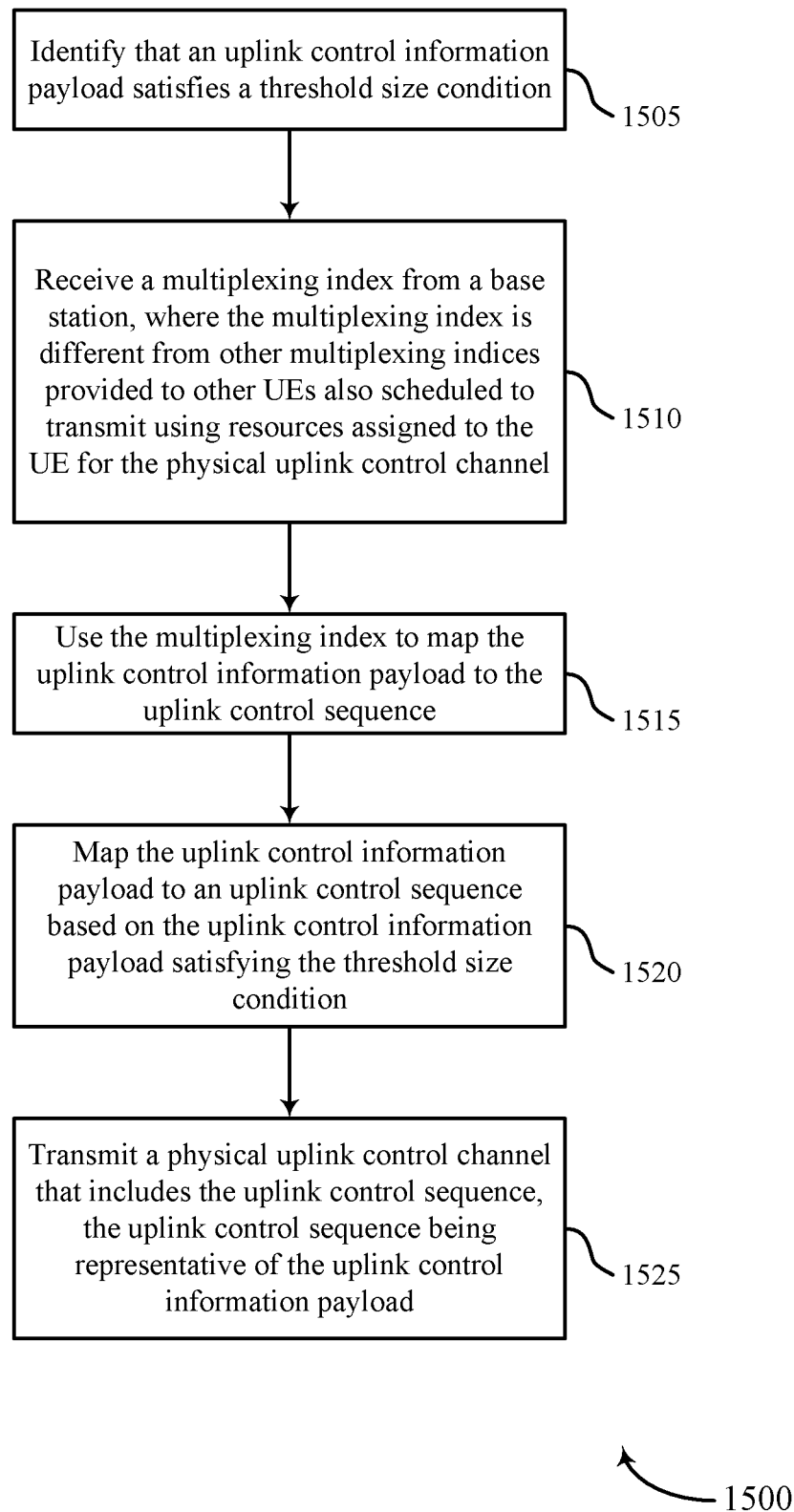

FIG. 15 shows a flowchart illustrating a method 1500 that supports sequence based PUCCH transmission in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1505, the UE may identify that an UCI payload satisfies a threshold size condition. The operations of 1505 may be performed according to the methods described herein. In some examples, aspects of the operations of 1505 may be performed by a threshold component as described with reference to FIGS. 5 through 8.

At 1510, the UE may receive a multiplexing index from a base station, where the multiplexing index is different from other multiplexing indices provided to other UEs also scheduled to transmit using resources assigned to the UE for the PUCCH. The operations of 1510 may be performed according to the methods described herein. In some examples, aspects of the operations of 1510 may be performed by a multiplexing component as described with reference to FIGS. 5 through 8.

At 1515, the UE may use the multiplexing index to map the UCI payload to the uplink control sequence. The operations of 1515 may be performed according to the methods described herein. In some examples, aspects of the operations of 1515 may be performed by a multiplexing component as described with reference to FIGS. 5 through 8.

At 1520, the UE may map the UCI payload to an uplink control sequence based on the UCI payload satisfying the threshold size condition. The operations of 1520 may be performed according to the methods described herein. In some examples, aspects of the operations of 1520 may be performed by a mapping component as described with reference to FIGS. 5 through 8.

At 1525, the UE may transmit a PUCCH that includes the uplink control sequence, the uplink control sequence being representative of the UCI payload. The operations of 1525 may be performed according to the methods described herein. In some examples, aspects of the operations of 1525 may be performed by an uplink control sequence component as described with reference to FIGS. 5 through 8.

Figure 16:
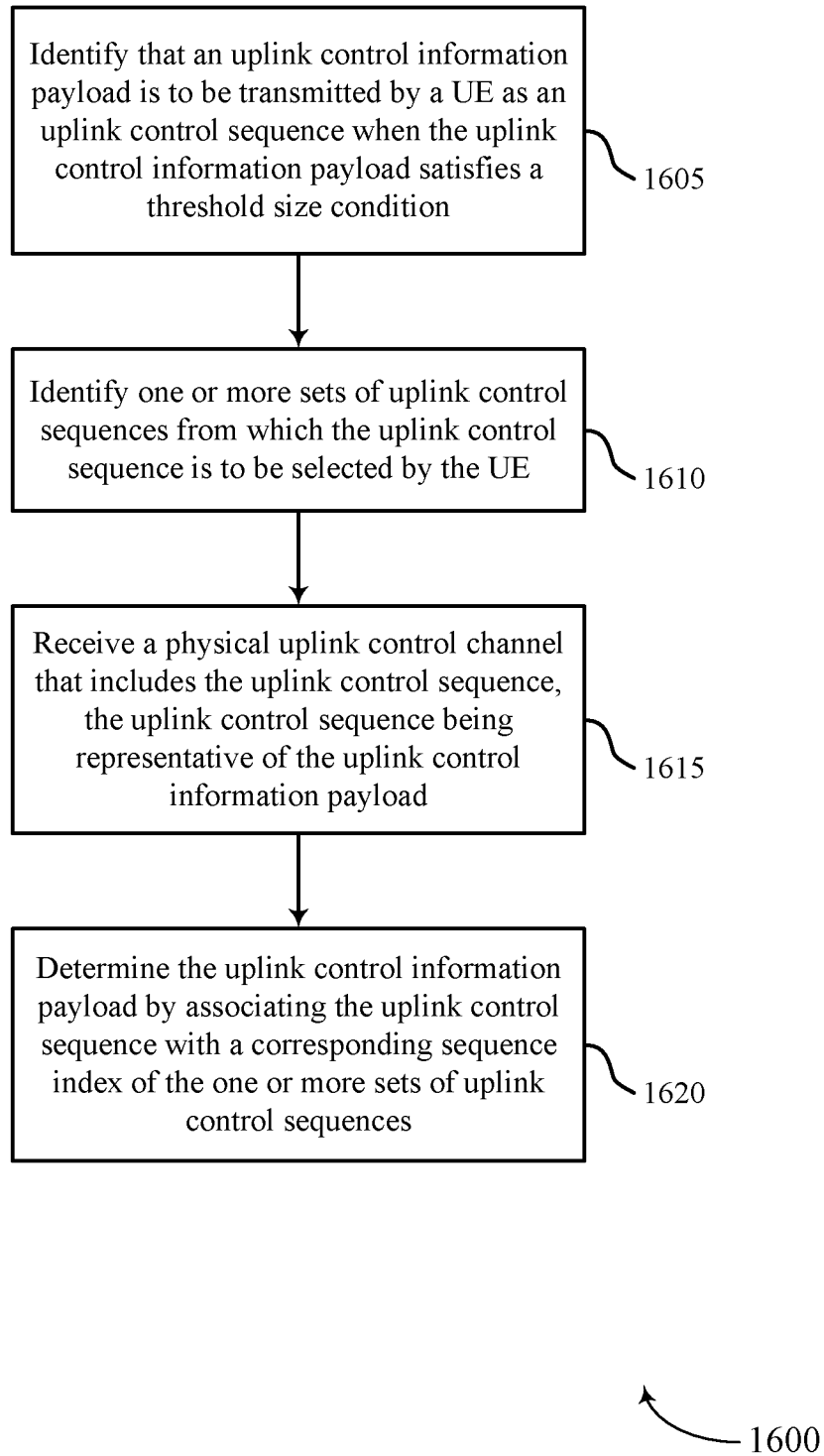

FIG. 16 shows a flowchart illustrating a method 1600 that supports sequence based PUCCH transmission in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1605, the base station may identify that an UCI payload is to be transmitted by a UE as an uplink control sequence when the UCI payload satisfies a threshold size condition. The operations of 1605 may be performed according to the methods described herein. In some examples, aspects of the operations of 1605 may be performed by an UCI identification component as described with reference to FIGS. 9 through 12.

At 1610, the base station may identify one or more sets of uplink control sequences from which the uplink control sequence is to be selected by the UE. The operations of 1610 may be performed according to the methods described herein. In some examples, aspects of the operations of 1610 may be performed by a sequence identification component as described with reference to FIGS. 9 through 12.

At 1615, the base station may receive a PUCCH that includes the uplink control sequence, the uplink control sequence being representative of the UCI payload. The operations of 1615 may be performed according to the methods described herein. In some examples, aspects of the operations of 1615 may be performed by a PUCCH reception component as described with reference to FIGS. 9 through 12.

At 1620, the base station may determine the UCI payload by associating the uplink control sequence with a corresponding sequence index of the one or more sets of uplink control sequences. The operations of 1620 may be performed according to the methods described herein. In some examples, aspects of the operations of 1620 may be performed by an UCI determination component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the herein are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   identifying that an uplink control information payload satisfies a threshold size condition;
   generating a pseudo-random uplink control sequence initialized by a seed, the seed being generated based at least in part on the uplink control information payload, wherein the pseudo-random uplink control sequence is a binary or quadrature phase shift keying modulated Gold or M sequence;
   mapping the uplink control information payload to the pseudo-random uplink control sequence selected based at least in part on the generated seed, the mapping based at least in part on the uplink control information payload satisfying the threshold size condition; and
   transmitting a physical uplink control channel that includes the pseudo-random uplink control sequence, the pseudo-random uplink control sequence being representative of the uplink control information payload.

2. The method of claim 1, wherein transmitting the physical uplink control channel comprises:
   transmitting the pseudo-random uplink control sequence as a non-coherent transmission without a demodulation reference signal.

3. The method of claim 1, further comprising:
   multiplying the pseudo-random uplink control sequence with a signature sequence, wherein transmission of the pseudo-random uplink control sequence comprises transmission of the multiplied pseudo-random uplink control sequence with the signature sequence.

4. The method of claim 3, further comprising:
   receiving a multiplexing index from a network device; and
   generating the signature sequence based at least in part on the multiplexing index.

5. The method of claim 3, wherein the pseudo-random uplink control sequence and the signature sequence are of a same length.

6. The method of claim 3, wherein the signature sequence is associated with one of a plurality of transmission antennas of the UE.

7. The method of claim 6, wherein the signature sequence associated with the one of the plurality of transmission antennas is orthogonal to other signature sequences associated with others of the plurality of transmission antennas of the UE.

8. The method of claim 6, further comprising:
   receiving an indication that the UE is to use some or all of the plurality of transmission antennas in transmitting the physical uplink control channel.

9. The method of claim 8, wherein the indication comprises an indication of a format of the physical uplink control channel.

10. The method of claim 3, wherein the signature sequence is associated with the UE or with a physical uplink control channel resource that the UE uses to transmit the physical uplink control channel.

11. The method of claim 1, further comprising:
selecting the pseudo-random uplink control sequence from one or more sets of pseudo-random uplink control sequences, wherein uplink control sequences in the one or more sets of pseudo-random uplink control sequences are binary or quadrature phase shift keying modulated Gold or M sequences.

12. The method of claim 11, wherein the binary or quadrature phase shift keying modulated Gold or M sequences are $\pi/2$ binary phase shift keying or quadrature phase shift keying modulated Gold or M sequences.

13. The method of claim 1, wherein generating the seed comprises generating the seed for the binary or quadrature phase shift keying modulated Gold or M sequence based at least in part on the uplink control information payload, the method further comprising:
selecting the binary or quadrature phase shift keying modulated Gold or M sequence based at least in part on the generated seed.

14. The method of claim 13, further comprising:
mapping the uplink control information payload to the seed, wherein the selecting the binary or quadrature phase shift keying modulated Gold or M sequence is based at least in part on the mapping the uplink control information payload to the seed.

15. The method of claim 1, wherein the seed is generated based at least in part on the uplink control information payload and a UE identifier, a cell identifier, or a multiplexing index, or a combination thereof.

16. The method of claim 15, further comprising:
receiving the multiplexing index from a network device, wherein the multiplexing index is different from other multiplexing indices provided to other UEs also scheduled to transmit using resources assigned to the UE for the physical uplink control channel; and
using the multiplexing index to map the uplink control information payload to generate the seed.

17. The method of claim 16, wherein using the multiplexing index to map the uplink control information payload to generate the seed further comprises:
converting the multiplexing index into a binary string;
concatenating the binary string with the uplink control information payload to form a concatenated string; and
converting the concatenated string to a decimal value, wherein the seed is generated based at least in part on the decimal value representing the concatenated string.

18. The method of claim 16, wherein using the multiplexing index to map the uplink control information payload to generate the seed further comprises:
converting the uplink control information payload to a decimal value; and
summing a first multiple of the decimal value representing the uplink control information payload with a second multiple of the multiplexing index to form a summed decimal value, wherein the seed is generated based at least in part on the summed decimal value.

19. The method of claim 1, further comprising:
applying a transform precoding operation to the pseudo-random uplink control sequence; and
mapping the pseudo-random uplink control sequence to frequency domain resources after application of the transform precoding operation and prior to transmission of the physical uplink control channel.

20. The method of claim 1, further comprising:
mapping the pseudo-random uplink control sequence to frequency domain resources prior to transmission of the physical uplink control channel, wherein the pseudo-random uplink control sequence is non-transform precoded.

21. The method of claim 1, wherein identifying that the uplink control information payload satisfies the threshold size condition comprises:
identifying that the uplink control information payload is less than or equal to a predetermined maximum payload size.

22. A method for wireless communications at a network device, comprising:
identifying that an uplink control information payload is to be transmitted by a user equipment (UE) as a pseudo-random uplink control sequence that is initialized by a seed when the uplink control information payload satisfies a threshold size condition, wherein the pseudo-random uplink control sequence is a binary or quadrature phase shift keying modulated Gold or M sequence;
identifying one or more sets of pseudo-random uplink control sequences from which the pseudo-random uplink control sequence is to be selected by the UE based at least in part on the seed, wherein the seed is generated based at least in part on the uplink control information payload;
receiving a physical uplink control channel that includes the pseudo-random uplink control sequence based at least in part on the seed, the pseudo-random uplink control sequence being representative of the uplink control information payload; and
determining the uplink control information payload by associating the pseudo-random uplink control sequence with a corresponding sequence index of the one or more sets of pseudo-random uplink control sequences.

23. The method of claim 22, wherein receiving the physical uplink control channel comprises:
receiving the pseudo-random uplink control sequence as a non-coherent transmission without a demodulation reference signal.

24. The method of claim 22, wherein the corresponding sequence index is a decimal value of the uplink control information payload.

25. The method of claim 22, wherein determining the uplink control information payload comprises:
identifying that the pseudo-random uplink control sequence has been multiplied with a signature sequence prior to transmission of the pseudo-random uplink control sequence.

26. The method of claim 25, wherein the signature sequence and the pseudo-random uplink control sequence prior to multiplication with the signature sequence are of a same length.

27. The method of claim 25, wherein the signature sequence is associated with one of a plurality of transmission antennas of the UE.

28. The method of claim 27, wherein the signature sequence associated with the one of the plurality of transmission antennas is orthogonal to other signature sequences associated with others of the plurality of transmission antennas of the UE.

29. The method of claim 27, further comprising:
transmitting an indication that the UE is to use some or all of the plurality of transmission antennas in transmitting the physical uplink control channel.

30. The method of claim 29, wherein the indication is associated with a format of the physical uplink control channel.

31. The method of claim 22, wherein the one or more sets of pseudo-random uplink control sequences from which the pseudo-random uplink control sequence is selected includes sequences that are binary or quadrature phase shift keying modulated Gold or M sequences.

32. The method of claim 22, wherein identifying that the uplink control information payload satisfies the threshold size condition comprises:
identifying that the uplink control information payload is less than or equal to a predetermined maximum payload size.

33. An apparatus for wireless communication at a user equipment (UE), comprising:
a processor,
memory coupled with the processor; and
instructions stored in the memory and operable, when executed by the processor, to cause the apparatus to:
identify that an uplink control information payload satisfies a threshold size condition;
generate a pseudo-random uplink control sequence initialized by a seed, the seed being generated based at least in part on the uplink control information payload, wherein the pseudo-random uplink control sequence is a binary or quadrature phase shift keying modulated Gold or M sequence;
map the uplink control information payload to the pseudo-random uplink control sequence selected based at least in part on the generated seed, the mapping based at least in part on the uplink control information payload satisfying the threshold size condition; and
transmit a physical uplink control channel that includes the pseudo-random uplink control sequence, the pseudo-random uplink control sequence being representative of the uplink control information payload.

34. An apparatus for wireless communications at a network device, comprising:
a processor,
memory coupled with the processor; and
instructions stored in the memory and operable, when executed by the processor, to cause the apparatus to:
identify that an uplink control information payload is to be transmitted by a user equipment (UE) as a pseudo-random uplink control sequence that is initialized by a seed when the uplink control information payload satisfies a threshold size condition, wherein the pseudo-random uplink control sequence is a binary or quadrature phase shift keying modulated Gold or M sequence;
identify one or more sets of pseudo-random uplink control sequences from which the pseudo-random uplink control sequence is to be selected by the UE based at least in part on the seed, wherein the seed is generated based at least in part on the uplink control information payload;
receive a physical uplink control channel that includes the pseudo-random uplink control sequence based at least in part on the seed, the pseudo-random uplink control sequence being representative of the uplink control information payload; and
determine the uplink control information payload by associating the pseudo-random uplink control sequence with a corresponding sequence index of the one or more sets of pseudo-random uplink control sequences.

35. An apparatus for wireless communication at a user equipment (UE), comprising:
means for identifying that an uplink control information payload satisfies a threshold size condition;
means for generating a pseudo-random uplink control sequence initialized by a seed, the seed being generated based at least in part on the uplink control information payload, wherein the pseudo-random uplink control sequence is a binary or quadrature phase shift keying modulated Gold or M sequence;
means for mapping the uplink control information payload to the pseudo-random uplink control sequence selected based at least in part on the generated seed, the mapping based at least in part on the uplink control information payload satisfying the threshold size condition; and
means for transmitting a physical uplink control channel that includes the pseudo-random uplink control sequence, the pseudo-random uplink control sequence being representative of the uplink control information payload.

36. An apparatus for wireless communications at a network device, comprising:
means for identifying that an uplink control information payload is to be transmitted by a user equipment (UE) as a pseudo-random uplink control sequence that is initialized by a seed when the uplink control information payload satisfies a threshold size condition, wherein the pseudo-random uplink control sequence is a binary or quadrature phase shift keying modulated Gold or M sequence;
means for identifying one or more sets of pseudo-random uplink control sequences from which the pseudo-random uplink control sequence is to be selected by the UE based at least in part on the seed, wherein the seed is generated based at least in part on the uplink control information payload;
means for receiving a physical uplink control channel that includes the pseudo-random uplink control sequence based at least in part on the seed, the pseudo-random uplink control sequence being representative of the uplink control information payload; and
means for determining the uplink control information payload by associating the pseudo-random uplink control sequence with a corresponding sequence index of the one or more sets of pseudo-random uplink control sequences.

37. A non-transitory computer-readable medium storing code for wireless communication at a user equipment (UE), the code comprising instructions executable by a processor to:
identify that an uplink control information payload satisfies a threshold size condition;
generate a pseudo-random uplink control sequence that is initialized by a seed, the seed being generated based at least in part on the uplink control information payload, wherein the pseudo-random uplink control sequence is a binary or quadrature phase shift keying modulated Gold or M sequence;
map the uplink control information payload to the pseudo-random uplink control sequence selected based at least in part on the generated seed, the mapping based at least in part on the uplink control information payload satisfying the threshold size condition; and
transmit a physical uplink control channel that includes the pseudo-random uplink control sequence, the pseudo-random uplink control sequence being representative of the uplink control information payload.

38. A non-transitory computer-readable medium storing code for wireless communications at a network device, the code comprising instructions executable by a processor to:
   identify that an uplink control information payload is to be transmitted by a user equipment (UE) as a pseudo-random uplink control sequence that is initialized by a seed when the uplink control information payload satisfies a threshold size condition, wherein the pseudo-random uplink control sequence is a binary or quadrature phase shift keying modulated Gold or M sequence;
   identify one or more sets of pseudo-random uplink control sequences from which the pseudo-random uplink control sequence is to be selected by the UE based at least in part on the seed, wherein the seed is generated based at least in part on the uplink control information payload;
   receive a physical uplink control channel that includes the pseudo-random uplink control sequence based at least in part on the seed, the pseudo-random uplink control sequence being representative of the uplink control information payload; and
   determine the uplink control information payload by associating the pseudo-random uplink control sequence with a corresponding sequence index of the one or more sets of pseudo-random uplink control sequences.

* * * * *